United States Patent
McNamar et al.

(10) Patent No.: US 7,089,202 B1
(45) Date of Patent: Aug. 8, 2006

(54) METHOD AND SYSTEM FOR INTERNET BANKING AND FINANCIAL SERVICES

(75) Inventors: Richard T. McNamar, Redding, CT (US); Cathleen Noland, 1040 Park Ave., New York, NY (US) 10028; Joseph J. Rucci, Jr., New Canaan, CT (US)

(73) Assignee: Cathleen Noland, New York, NY (US)

( * ) Notice: Subject to any disclaimer, the term of this patent is extended or adjusted under 35 U.S.C. 154(b) by 0 days.

(21) Appl. No.: 09/578,508

(22) Filed: May 26, 2000

Related U.S. Application Data

(60) Provisional application No. 60/136,400, filed on May 27, 1999.

(51) Int. Cl.
    *G06F 17/60* (2006.01)

(52) U.S. Cl. ............................. 705/35; 705/36 R

(58) Field of Classification Search ............. 705/35–40
    See application file for complete search history.

(56) References Cited

U.S. PATENT DOCUMENTS

| | | | | |
|---|---|---|---|---|
| 5,826,243 A | * | 10/1998 | Musmanno et al. | 705/35 |
| 5,870,721 A | * | 2/1999 | Norris | 705/38 |
| 5,875,437 A | * | 2/1999 | Atkins | 705/40 |
| 6,108,641 A | * | 8/2000 | Kenna et al. | 705/35 |
| 6,131,810 A | * | 10/2000 | Weiss et al. | 235/379 |

FOREIGN PATENT DOCUMENTS

| | | | |
|---|---|---|---|
| JP | 2000250981 A | * | 9/2000 |
| WO | WO 96/41287 | * | 12/1996 |
| WO | WO 99/09470 | * | 2/1999 |

OTHER PUBLICATIONS

"E*Trade Financial Corporation Introduces E*TRADE Complete ™: An intelligent, integrated way for customers to manage all of their money" (PR Newswire) (Apr. 4, 2005).*

* cited by examiner

*Primary Examiner*—Hani M. Kazimi
*Assistant Examiner*—Narayanswamy Subramanian
(74) *Attorney, Agent, or Firm*—Foley & Lardner LLP

(57) ABSTRACT

A computer implemented method of providing a client with an integrated financial management account, including receiving application data for an integrated financial management account and setting up the integrated financial account with a loan component data, an investment component data, and an insurance component, all associated with an account file. Thereby qualifying the client for a loan in the loan component of the integrated financial management account and associating the qualification information with the account file, disbursing the proceeds of the loan component into the investment component by recording a proceed value in the investment component data associated with the account file, and purchasing investment assets using the proceeds of the loan component and associating purchased investment assets to the investment component data associated with the account file.

57 Claims, 29 Drawing Sheets

METHOD AND SYSTEM FOR INTERNET BANKING AND FINANCIAL SERVICES

NOTICE OF COPYRIGHT MATERIAL IN DISCLOSURE

This application claims the benefit of priority under 35 U.S.C. 119(e) of provisional application 60/136,400 filed on May 27, 1999, the content of which is incorporated herein in its entirety. A portion of the disclosure in this patent document contains material which is subject to copyright protection. The copyright owner has no objection to the facsimile reproduction of the patent document or the patent disclosure in its entirety but not separately, as it appears in the Patent and Trademark Office patent files or records, but otherwise reserves all copyright rights in their entirety.

FIELD OF THE INVENTION

This invention relates to a system and process for a personal integrated financial management account that enables a client to utilize an asset, such as the equity in their home to obtain a loan used to purchase indexed funds or mutual funds for appreciation. The present invention also relates to the integrated financial management account providing additional account features such as insurance, or financial derivatives used to insure against the loss of loan principal and/or appreciation in the funds due to subsequent market declines. The account also provides clients with the ability to customize and modify the account at any time and to obtain real time or near real time valuations of the assets and liabilities. The present invention also relates to a system and process for performing such transactions remotely in a secure manner in substantially real time or near real time.

BACKGROUND OF THE INVENTION

Today the percentage of households in America and worldwide that own stocks has increased substantially. Either through pension funds, 401K plans, mutual funds or purchase of individual stocks, most homeowners participate in varying degrees in the equity market. More recently, many investors who previously purchased actively managed mutual funds now purchase stock index funds that acquire and hold securities that mirror the performance of some equity index, e.g. S&P 500, Russell 2000, or a sector specific index, technology, or funds balanced to reflect movements in both debt and equity. In short, Americans and other worldwide investors have become financially sophisticated investors with an understanding of stock markets, mutual funds, and the alternative types of fund investments available. For example, recognizing research that indicates that most investors cannot beat the performance of the stock market overall, and that over 80 to 90% of the actively managed mutual funds do not outperform passively managed index funds, Americans have increased their purchasing of stock index funds substantially. Many Americans now regard these indexed fund investments as the safest, most liquid, and prudent way to invest for stock appreciation rates of return over time.

Currently, most investment funds are sold by and managed by stock brokerage firms, mutual fund firms, and money management organizations. The money management organizations may be independent or part of another financial service institution, e.g. a brokerage house or a commercial bank. Current banking and securities laws require that the offerings and disclosures relating to the funds, whether offered by a brokerage firm or a commercial bank, ensure that the customer does not believe that the accounts are insured by the Federal Government.

Margin accounts for investments are well established and regulated by the appropriate margin account limit for collateral as a percent of fair market value set by the Federal Reserve Board, which limit is applicable to all commercial banks, savings banks, and brokerage houses. At present a customer can borrow up to 50% of the fair market value of the customers portfolio held by the mutual fund company or the brokerage house to be borrowed and used for other purposes, including reinvesting the loan proceeds in the account. Because neither the mutual fund company nor the brokerage firm is in the business of making margin loans on a wide scale, the loans are relatively expensive, and under current income tax laws the interest is not always tax deductible by individual taxpayers.

While they have the legal authority, commercial and savings banks have not been in the primary business of making margin loans against securities. And, while most banks or bank holding company's have the legal authority to offer their customers brokerage services and mutual funds, they have only been partially successful, since it is not the central focus of their business. Cross-selling financial services products has been largely a failure in almost all instances in which it has been tried in banks, insurance companies, and brokerage firms. The products are regarded as different and typically require two separate sales forces either by law or practice.

Since the change in the Internal Revenue Code in 1987, a major business for banks has been the offering of secured mortgages, known as home equity lines of credit or home equity loans. Interest on these loans is tax deductible against other income for loans totaling up to $100,000 per couple on primary and/or secondary homes (up to their fair market value). These loans have proliferated and are offered widely through television and other advertising. Some of these loans, combined with the first mortgage result in for a loan to value ratio of 100% or even 125% of the fair market value of the house that is mortgaged.

The bank to which a customer applies for a home equity loan considers or evaluates the use of the loans proceeds in making its underwriting decision. For example, home remodeling, which is assumed to increase the value of the house as underlying collateral, is favored by bank lender and their regulators. Similarly, the consolidation of credit card debt to reduce monthly after-tax debt payments is favored. In credit card debt consolidation, the interest paid on the home equity loan is tax deductible within the limitations above, whereas interest on credit card debt is not. This use of loan funds is considered as making the borrower more creditworthy since a higher proportion of monthly interest payments are now tax deductible when the home equity line is used to pay off the credit card debt and therefore, all other things being equal, the borrower should have more after-tax cash flow remaining for the same or less pretax dollars of interest payments.

Home equity loans are often advertised or marketed to homeowners with high credit card debt and the use of the proceeds from the loan is specified for this purpose. The process of applying for a home equity loan through a bank is complex, time consuming, and must be completed prior to the time the bank can fund the loan. Today home equity loans are offered by banks through their branch offices, by mail, over the telephone, and some banks solicit and accept applications over the Internet. However, all home equity loan applications eventually entail paper delays, consumer inconvenience, normal banking intimidation and a detailed inquiry as to the purpose of the loan. In short, today's home equity loan process is not automated, is not simple, is intimidating and the applicant receives no value or financial benefit until the entire process is completed.

Currently the process of obtaining a home equity loan is standardized, with the borrower having little say over the duration, terms, or interest payment process. For example, banks cannot permit interest on the loan to be accrued, and still have the loan classified as a performing loan on review and examination by the banking regulators. Hence the customer or borrowers choices are circumscribed. Additionally, the process is detailed and sequential with many opportunities for errors on the part of the customer or the bank, which result in a delay in the customer's loan application processing and the loan underwriting process. Should errors occur, manual intervention and investigation is necessary, further delaying the processing of the loan application. Moreover, the consumer must wait until all of the required steps are completed before the loan is funded and disbursed, which is the first time there is any tangible benefit to the customer. This lag between initial application and consumer benefit can be several days, but is typically weeks.

Most banks offer relatively standardized home equity loan products with the customer having limited opportunity to customize the duration, terms, or interest rate components of the loan offered by the bank. Typically, the only three important terms will be whether the rate is fixed or floating, the duration of the home equity loan, and the interest-only period before principal amortization payments start. While the consumer may request one of these features, the bank ultimately determines the terms and conditions of the home equity loan it is prepared to make, and most consumers have little choice or influence over the terms or method of payments for their home equity loan.

For most homeowners, their house is their largest single investment. Therefore their home equity is their largest single asset, but is not a liquid asset so long as it remains untapped. While the overall value of a homeowner's house may appreciate in value 2–6% per year on average for the country, this is far below the long-term average appreciation in the stock market of 12.5% per year. At a 4% rate of appreciation the initial value of a homeowners equity will double in approximately 19 years. At 12.5%, the same initial value will double in 5.5 years.

The present commercial banking laws, dating back to the Glass-Steagal Act in 1930's, make it cumbersome, slow, error prone, and time-consuming for a consumer to utilize the accumulated equity in their house as collateral to borrow to invest in equity-like funds or financial instruments that allow the homeowner to conveniently utilize the equity in their house to achieve an equity return in that currently dormant uninvested asset, which is typically the homeowners largest single asset. There is no easy, automatic, and convenient process in one transaction to use one financial service product or account that allows the customer to conveniently employ their home equity to increase their investments on a tax-favored basis by having the interest on an investment account be tax deductible.

At the present time, there is no single integrated financial services product or account that exists that provides for a home equity loan and an ability to customize the account so that the customer can pre-select or choose both the investment fund's asset mix to be purchased, and customize the account, plus having certain performance benchmarks chosen by the customer that when met or exceeded, will trigger an alert, such as a voice call or electronic message to the account owner.

SUMMARY OF THE INVENTION

Therefore, it is a general objective of the invention to alleviate the problems and shortcomings identified above.

One of the objectives of one aspect of the invention is a computer implemented integrated financial management account having an investment component linked to a loan component so that contemporaneous with setting up the integrated financial management account the client can be credited with an investment asset in the investment component of the integrated financial account. Another objective of one aspect of the invention is to provide the loan component as a mortgage loan including a second equity mortgage loan.

Another aspect of the invention provides a computer implemented method of providing a client with an integrated financial management account that includes receiving an application for an integrated financial management account from the client, and setting up the integrated financial account to have a loan component, an investment component, and an insurance component. Thereafter, the client is qualified for a loan in the loan component of the integrated financial management account, and the proceeds of the loan component are disbursed into the investment component for the purchase of investment assets.

Another aspect of the invention is to provide the integrated financial management account with triple protection for the loan disbursed into the loan component of the integrated financial management account. A collateral asset is pledged to secure the loan, the investment assets are assigned (or have a lien placed on them) to cover the loan, and a financial contract (such as a guarantee or insurance coverage) is provided to further cover either the full loan amount or cover a residual amount of the loan after the collateral asset and the investment assets have been liquidated to pay back the loan.

An objective of another aspect of the invention is to notify a client of the integrated financial management account whenever either the loan component or the investment component achieves a configurable benchmark.

An objective of another aspect of the invention is to mark to market, in real time or near real time, the investment component and the loan component of the integrated financial management account.

An objective of another aspect of the invention is to receive the application for the integrated financial management account through the internet or other electronic network.

An objective of another aspect of the invention is to provide the client with detailed insurance options including calculating and displaying the costs and benefits of purchasing the insurance options.

An objective of another aspect of invention is provide the client with different retirement planning options and calculating and displaying an actual or projected account value corresponding to the retirement planning options selected by the client.

An objective of another aspect of the invention is to provide a client with a margin loan on an increase in value of the investment asset so that the proceeds of the margin loan can be invested in the investment component of the integrated financial management account.

An objective of another aspect of the invention is to periodically assess the value of the property pledged for the mortgage loan and calculate and provide an additional loan as a percentage of any increase in value of the property.

An objective of another aspect of the invention is to provide customized responses to a client by providing a service provider on the basis of correlating a client characteristic to a given service provider.

These and other objectives are achieved by providing a computer implemented method of providing a client with an integrated financial management account including an investment component linked to a loan component, the method including the steps of: receiving an application for the integrated financial management account from the client; setting up an integrated financial management account shell with the investment component and the loan component; contemporaneous with the setting up of the integrated financial management account, crediting the client with an investment asset in the investment component of the integrated financial management account; qualifying the client for a loan in the loan component of the integrated financial management account; and after successful loan qualification, disbursing the proceeds of the loan component into the investment component, or after unsuccessful qualification, removing the investment asset in the investment component.

Also provided is a method in which the client is notified whenever either the loan component or the investment component achieves a client configurable benchmark.

Also provided is a method in which the values of the investment component and the loan component are marked to market in real time or near real time.

Also provided is a method in which the application for the integrated financial management account is received over the internet or other electronic network.

Also provided is a method in which detailed insurance information and options are provided together with a cost benefit analysis for each of the insurance options.

Further provided is a method in which retirement planning options are provided to the client and account values are calculated and displayed corresponding to the retirement planning options selected by the client.

Also provided is a method in which an increase in value of the investment asset is tracked so that an additional margin loan is provided against an increase in value of the investment asset and the proceeds of the margin loan are invested back through the investment component of the integrated financial management account.

Also provided is a method in which the value of the property pledged is periodically assessed, an additional loan is calculated and provided as a percentage of the increase in value of the property, and the proceeds of the additional loan is disbursed into the investment component of the integrated financial management account.

In a general aspect, the present invention provides an improved system for remotely opening a personal financial management investment account for homeowners to enable them to seamlessly utilize the equity in their house for a homeowner's loan that funds the purchase of an investment asset, e.g. a mutual fund in the account and permits the account owner to select the asset mix from certain choices, chosen from a number of options, such as the terms of the homeowners loan, insurance options, benchmarks, and one or more means notification when a benchmark has been met or exceeded. All of the functions and activities currently being performed separate loan, investment, insurance, and retirement planning transactions can be done in this one account. Adding the investment fund to the account credit enhances the home equity loan account to make it a performing loan for regulatory purposes, which permits the offering of features (including customization by the account owner) that are not presently available on other accounts available on a wide scale to brokerage, money management, or commercial banking clients today.

In another aspect, the present invention provides the integration of a variety of specific services that may be separately available to selected banking or brokerage customers. Each individual customer will pick from the product component menus to select the investment, home equity loan, margin loan, insurance, retirement planning and performance benchmarks and methods of notification to select the mix of services that are individually customized by each customer to reflect their individual decisions.

In another aspect, the present invention provides a consistent interface at all access points for consistency, quality control, and ease of delivery. As customers become familiar with the available interfaces and account customization options it will make it easier for Internet customers to use the product, and for third-party marketers, e.g. banks to be trained to offer it over their Internet banking network in their branches, or by other marketing channels. Consistency of product and the customer interface will assist these third-party marketing organizations to train their employees and sell the product to their existing customer base.

In another aspect, the present invention provides a computer implemented method of providing a client with an integrated financial management account, comprising: receiving application data for an integrated financial management account; setting up the integrated financial account with a loan component data, an investment component data, and an insurance component, all associated with an account file; qualifying the client for a loan in the loan component of the integrated financial management account and associating the qualification information with the account file; disbursing the proceeds of the loan component into the investment component by recording a proceed value in the investment component data associated with the account file; and purchasing investment assets using the proceeds of the loan component and associating purchased investment assets to the investment component data associated with the account file.

In another aspect, the present invention also provides a system for opening the account in a single session that includes the means of gathering the customer's relevant personal information, house cost and market value, current mortgage(s), employment data, and establishing the classes of investment assets to be purchased, the customized home equity loan, the credit history, the preliminary title situation, the life, accidental death and dismemberment component, the portfolio risk component, and the customers preferences for performance benchmarks for notification of the customer and the preferred methods of notifying the customer. In addition, the customer may choose an option to automatically increase the loan component (and investment component) as the house appreciates in value, margin the account when the asset values exceed certain benchmarks. Also provided is the option to plan for the automatic transfer of all or part of the accounts assets to designated children or relatives in stages or over time. Finally, based on the net value of the account, the customer is guaranteed a mortgage on a subsequent house that is purchased.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENT(S)

Figure 1:
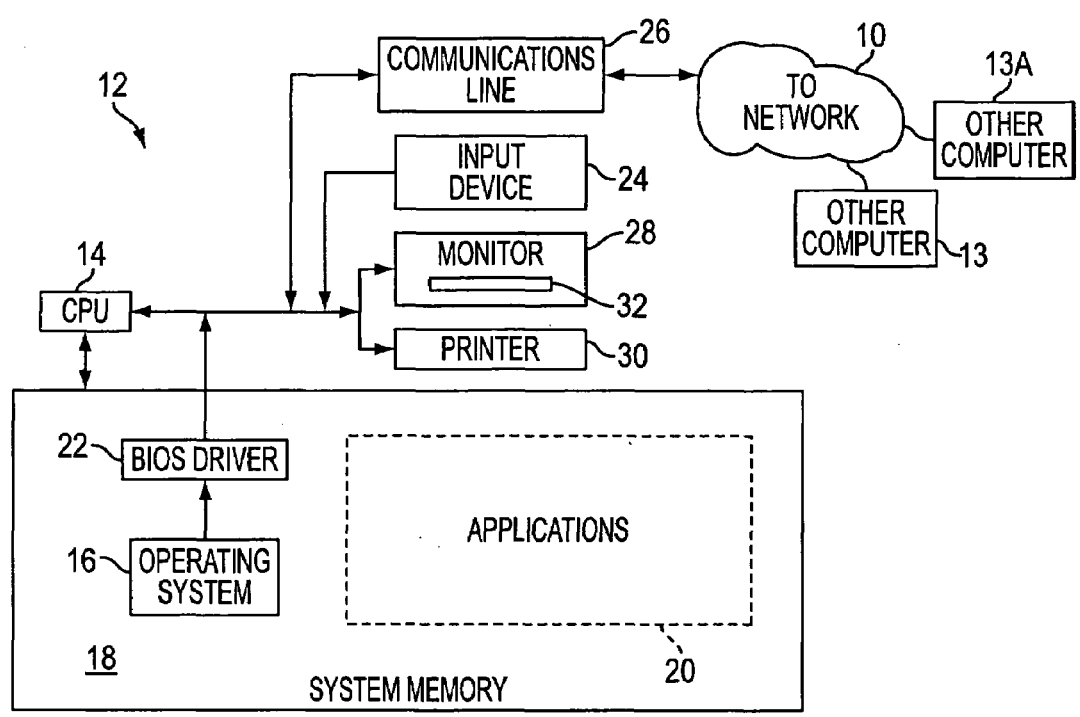
FIG. 1 is a diagram showing the components of a general purpose computer connected to a network.

The present invention recognizes that there is a need for a fully integrated financial management account that enables homeowners (or owners of other collateral assets that can be pledged) to open a single account with qualified investment assets and a home equity loan in the same account so that a customer can customize the account's asset and liability characteristics at the time the customer opens the account, and permits the customer to change those characteristics at their discretion 24 hours a day from any location using a personal computer, the Internet, or other suitable telecommunications network for the account to change options within the plan sponsor' menu of plan modification choices. In addition, the inventors have recognized a need for an account that has the option of automatically having a margin loan in the account to purchase additional investment assets for the account. The inventors have also recognized a need to have a financial services account that permits the borrower to customize the home equity borrowing to permit the borrower to accrue interest or borrow from the account the interest to be paid on the loan while meeting current banking supervision criteria for a performing loan underwritten and held by the lender. The inventors have also recognized a need for this type of account to support a credit or debit card or use a credit or debit card to pay the current interest on the home equity line in the account or to make purchases.

In a general aspect, the present invention provides a computer implemented method of providing a client with a single integrated financial management account which has an investment component linked to a loan component. The present invention contemplates that the single integrated financial management account is opened based on one set of account opening documentation or information presented by a client. Therefore, a single set of documents presented by a client is sufficient for opening the integrated financial management account having both an investment component and a loan component. Alternatively, the present invention contemplates that the account can be opened using information that can be presented in one interactive session so that both the loan component and the investment component of the integrated financial management account are set up based on a single interaction with the client.

A further aspect of the invention provides that on receiving an application for the integrated financial management account, an integrated financial account shell is set up. Contemporaneous with the process of setting up the integrated financial management account, an investment asset is credited to the investment component so that the client can benefit from any appreciation of the investment asset right from the time of applying for the integrated financial management account.

Thereafter, the client is qualified for a secured loan in the loan component of the account and on successful qualification, the proceeds of the loan are disbursed to the investment component so that the investment assets are owned by the client. If the loan qualification is unsuccessful, the investment assets are removed from the integrated financial management account which may then be closed.

It should also be understood that the processes described herein are programmable for use in a general purpose or special purpose computer or a group of such computers on a computer network. Furthermore, the general purpose or special purpose computer or computer network can be connected to an external electronic network or a public network, such as the Internet. Programming such computers and connecting to such electronic networks is within the abilities of one of ordinary skill in the art.

FIG. 1 is a block diagram showing the components of a general purpose computer system 12 connected to an electronic network 10, such as a computer network. The computer network can also be a public network, such as the Internet. As shown in the FIG. 1, the computer system 12 includes a central processing unit (CPU) 14 connected to a system memory 18. The system memory 18 typically contains an operating system 16, a BIOS driver 22, and application programs 20. The application programs 20 include one or more projection routines for calculating projection values for various parameters to be discussed hereinafter using state of the art industry algorithms. In addition, the computer system 12 contains input devices 24 such as a mouse and a keyboard 32, and output devices such as a printer 30 and a display monitor 28. The computer system generally includes a communications interface 26, such as an ethernet card, to communicate to the electronic network 10. Other computer systems 13 and 13A also connect to the electronic network 10 which can be implemented as Wide Area Network (WAN) or as an internetwork such as the Internet. One of skill in the art would recognize that the above system describes the typical components of a computer system connected to an electronic network. It should be appreciated that many other similar configurations are within the abilities of one skilled in the art and all of these configurations could be used with the method of the present invention. Furthermore, it should be recognized that the computer system and network disclosed herein can be programmed and configured, by one skilled in the art, to implement the method steps discussed further herein.

It should also be noted that for the purposes of this application, the term "House" includes, but is not limited to the following: free-standing house, attached house, townhouse, condominium house and apartment, cooperative house and apartment, timeshare house and apartment and condominium, farm and any other dwelling a customer may reside in, as well as any other real property.

Figure 2:
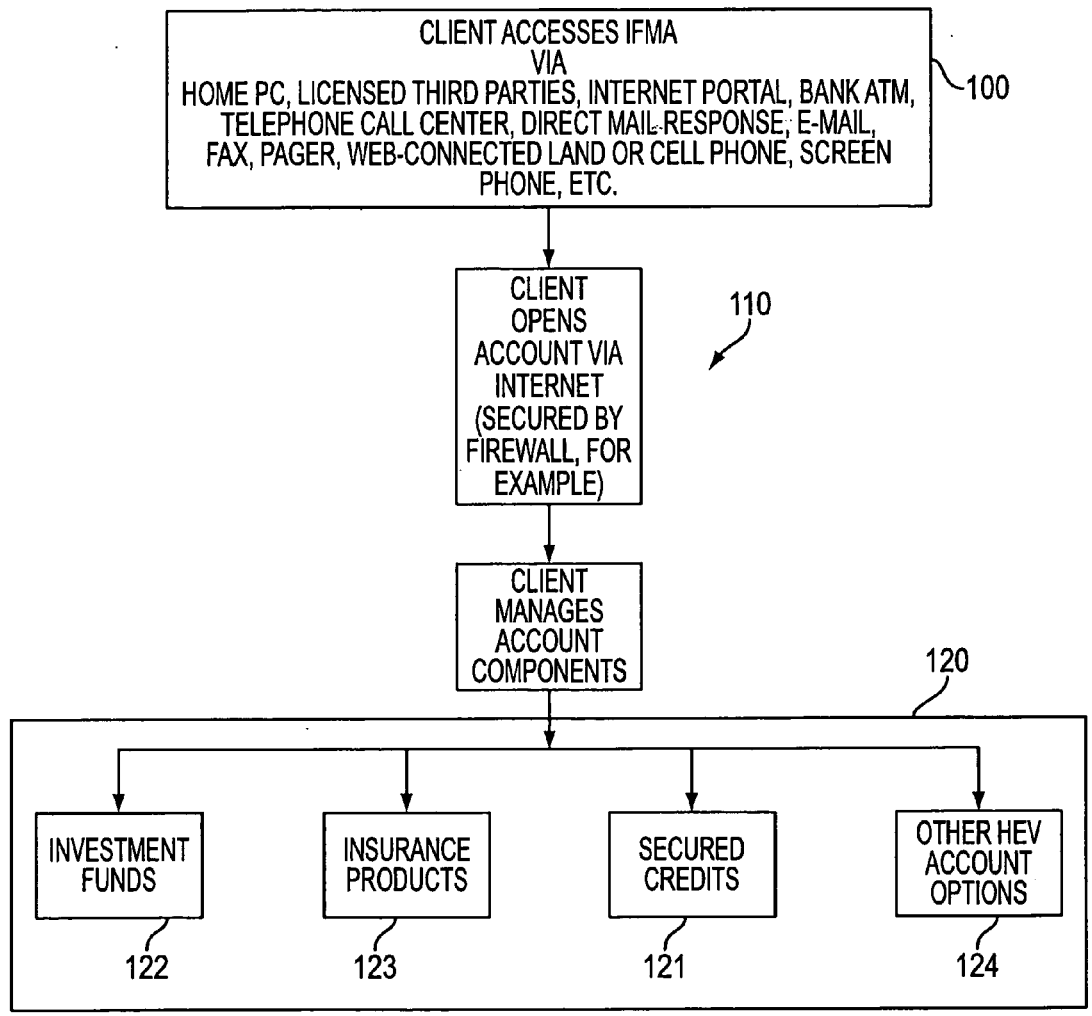
FIG. 2 is a block diagram showing the major parts of the Integrated Financial Management Account accessing system according to the present invention.

To discuss one preferred embodiment of the present invention, FIG. 2 provides a high level abstraction of the three parts of the invention. These high level parts are: (i) the client access part 100; (ii) the communication interface part 110; and (iii) the different major components 121–124 of the Integrated Financial Management Account ("IFMA") of the present invention.

The client access part 100 provides the computer hardware, software, and the communications capabilities that allow a client to access the IFMA components 120 through the communications interface 110. Using the client access part 100, a client can access the IFMA components 120 using a variety of methods ranging from direct contact over the Internet, normal telephone calls to a call center representative, faxes, e-mails, third-party customer representatives in a bank or other institution. The process of learning information about the IFMA account and proceeding to open the IFMA account may be instituted using any suitable communication method to connect with a computer system hosting the IFMA account.

The communications interface 110 provides a suitable connection to the computer system hosting the IFMA accounts. For example, the communications interface 110 could include using the Internet to access the IFMA account. Therefore, one preferred embodiment of the communication interface 110 is a TCP/IP communications controller with appropriate digital switched capability accessible over the Internet to a customer initiating contact directly via the Internet. Another embodiment of the invention is for the customer to apply through a third-party representative using the third-party's systems and middleware to access the IFMA computer system.

One feature of the present invention provides in a preferred embodiment, that the customers see a similar screen interface irrespective of the client access configurations. Of course, if a client accesses the IFMA account using a third parties interface, the screen could contain identifiers associated with that third party. In the preferred embodiment, the client would apply for the IFMA account via a secure, encrypted firewall to an IFMA computer system. One skilled in the art would appreciate that the IFMA computer system is not limited physically to a single computer system but could also include a distributed computer system including several computers connected by a suitable electronic network (including an internetwork).

The third major part of the present invention includes the account components 120 of the IFMA account. The account and the account components 120 comprise data structures with electronic data which may be implemented by one or a plurality of files and subfiles with appropriate electronic associations. The files or subfiles may be located in one computer or may be distributed in a plurality of local and/or remote computers across a network. The number of files and the manner of distribution among computers and across a network and the method of association is a design feature that may be chosen by the system designer. As noted, there are several important components of an IFMA account. One important component of the IFMA account is the secured loan component 121 which provides a secured loan to the client, such as a home equity loan or a securities margin loan or a loan based on any combination of acceptable securities.

Another component of the IFMA account components 120 is the an investment component 122 which typically holds the investment assets selected by the client. These investment assets include mutual funds or stock and/or bond index funds, which are funded for the account with the proceeds of the secured loan for which the client is approved. The investment assets would typically be selected from an approved list of investment assets provided and, in a preferred embodiment, displayed by the IFMA system. The provider of the IFMA account would have the ability to change the approved list of investment assets.

Another optional component of the IFMA account components 120 may be an insurance component 123 that may include one or more of life, accident, disability, insurance components that may be automatically provided to the client account owner or mortgage underwriter for a period of time. In addition, the client account owner or mortgage underwriter would have the option of paying to continue the insurance beyond this initial period, during the life of the account. Note that the term "mortgage underwriter" is intended to be construed broadly to cover all levels of mortgage providers ($1^{st}$, $2^{nd}$, $3^{rd}$, etc.) and to cover loan providers, generally, that are not associated with a mortgage.

In one embodiment, the insurance component 123 may provide that the insurance for repaying the loan is procured by or on behalf of the IFMA account provider without any insurance choice being provided to the client. In this embodiment, the cost of the insurance may be recovered by the IFMA provider through higher interest rates charged for the loans or by charging special fees, or by other such means. In some U.S. states, such as New York, regulations such as the New York state insurance department article 69, requires financial guarantee insurers to be monoline writers or put up a 50% reserve which may make it uneconomical for multiline insurers to write such financial guarantee insurance. Therefore, the insurance component 123, in one embodiment, contemplates that the IFMA provider arranges (for example, through a bank) to purchase any required financial guarantee insurance and recover the insurance costs from the clients by charging higher interest rates or fees, for example. Therefore, in one embodiment of the invention, the provider of the IFMA account self insures any loan granted in the loan component of the IFMA account.

The insurance component 123 could also include portfolio insurance that the client account owner or mortgage underwriter can purchase to guarantee the repayment to the IFMA account of the value, in whole or in part, of the original secured credit in the event that the market value of the investment assets declines to less than the amount of the loan principal outstanding at the time, for example, when the IFMA account is closed. That is, the insurance component 123 provides, in one embodiment, a residual value insurance to cover any shortfall in the loan balance outstanding (in the loan component of the IFMA) after liquidation of the investment assets in the investment component of the IFMA and/or the security or other collateral pledged to secure the loan in the loan component of the IFMA. In the context of the present invention, the term "portfolio insurance" is intended to be interpreted broadly to include insurance to maintain the original value of the asset in the IFMA, and to also include insurance against loss of the appreciation in the assets due to subsequent declines.

It should be understood that the insurance component 123 also contemplates other financial contracts or instruments or derivatives ("insurance equivalents") that guarantee the repayment, in whole or in part, of the loan provided in the loan component of the IFMA. Therefore, the present invention contemplates the use of other financial contracts that serve to insure the IFMA account provider of the full or partial repayment of the outstanding loan balance in the loan component of the IFMA. Some examples of other such financial contracts include, for example, a financial guarantee or a standby letter of credit. Other hedging instruments such as a total interest rate swap or options such as puts and calls may also be used to protect the IFMA account provider from any defaults in the repayment of the outstanding balance in the loan component of the IFMA.

Some of the other insurance equivalent products that might be provided include, for example, asset fund residual value insurance, mutual fund residual value insurance, asset fund/mutual fund maintenance value insurance, loan principal payoff insurance. Another insurance option that might be provided with the IFMA might include a "gains on the portfolio" insurance equal to, for example, a principal value of the loan. Therefore, if any additional loans are granted based on an appreciation of the portfolio or investment assets in the investment component of IFMA account, then the additional loan amount can also be insured so that, for example, the originally pledged security, such as the house, is not exposed to additional risk.

Other account options component 124 generically describes that other account options that could be provided with the IFMA account. Some of these additional account options are discussed further herein with respect to one or more of the account components discussed above. In addition, some of these account options could be provided as account options separate from any of the other IFMA account components discussed herein. One such account option could include activating a software routine to automatically track (compare) IFMA account parameters to preset benchmarks. Another exemplary account option could include the method of notification to the client when one or more of the benchmarks are achieved.

Figure 3:
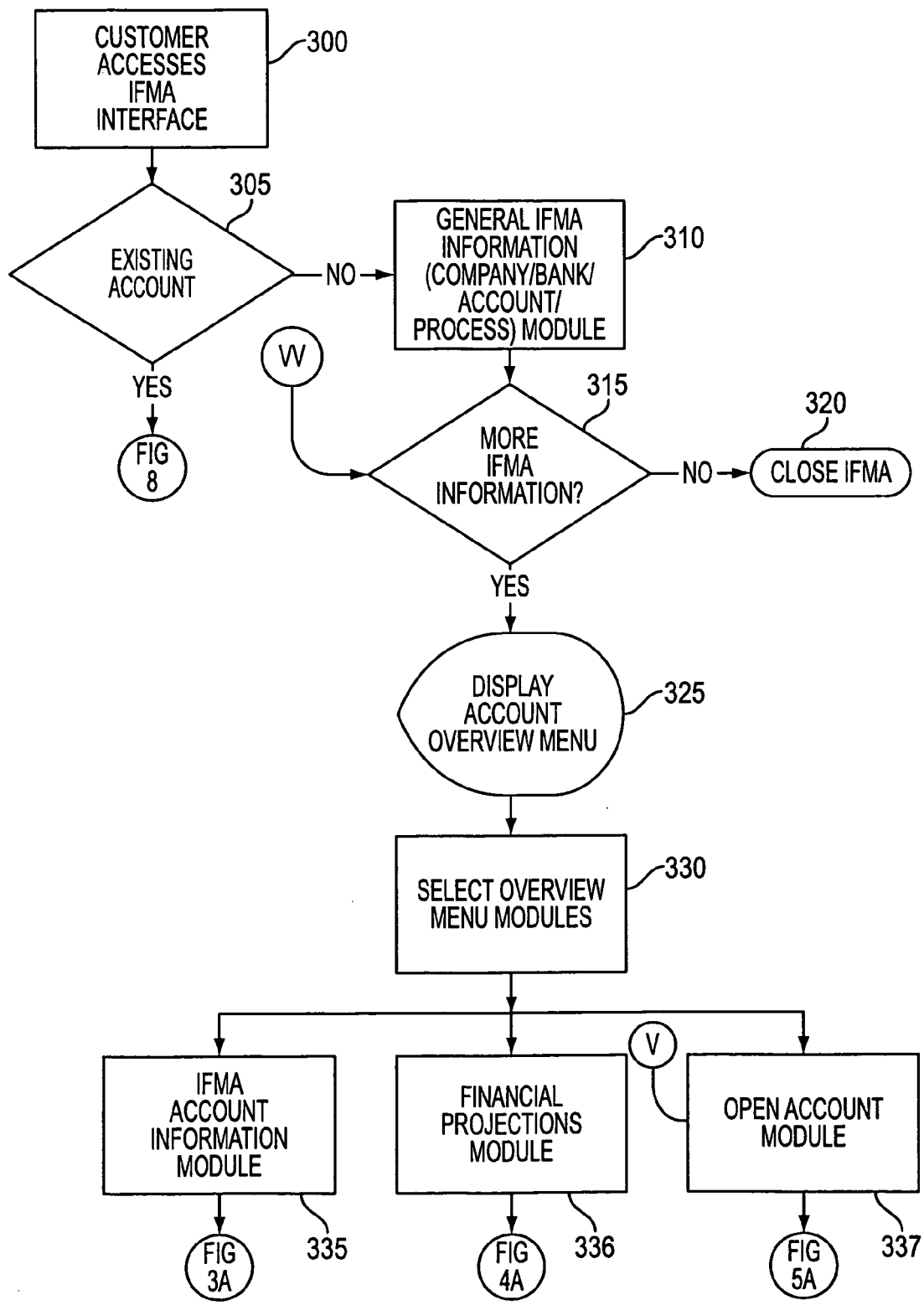
FIG. 3 is a flow diagram showing a preferred embodiment of the initial interaction with the Integrated Financial Management Account according to the present invention.

FIGS. 3 to 11 describe, in a preferred embodiment, the operations, functionality, and the interactions of IFMA account according to one preferred embodiment of the present invention. At the outset, as shown in the flowchart of FIG. 3, a client accesses the IFMA account on an IFMA computer system using the client access routine 100 and the communications interface 110 in step 300. The client typically accesses the IFMA account by means of a screen interface presenting a menu such as one implemented as a web page (a page on the World Wide Web) on the Internet.

Figure 8:
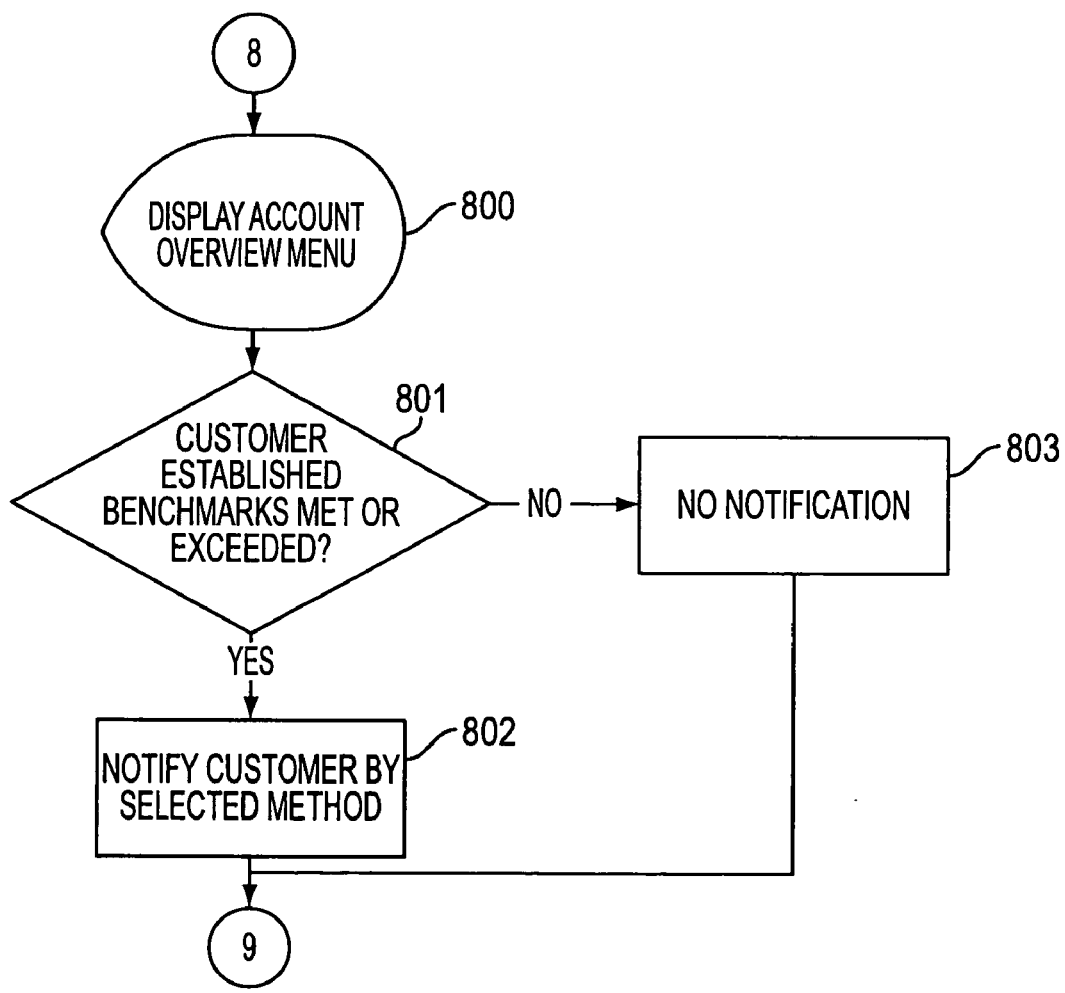
FIGS. 8 and 9 are flow diagrams illustrating the processing steps for an existing client's interaction with the Integrated Financial Management Account.

In step 305, if the client has an existing account, the processing proceeds to the steps discussed further herein with reference to FIG. 8. Otherwise, in step 310, general information about IFMA accounts is presented. For example in step 310, the information provided may include information about the company providing the IFMA account (IFMA account sponsor or provider), its officers and directors, place of incorporation and where it is licensed to do business, its size, its business strategy, how it operates, how it is regulated, and it financial strength, for example, it's AAA credit rating. The web site could provide hot links to other related subjects of interest to a potential customer. The information provided could describe the IFMA account product(s) being offered and explain the steps in opening an IFMA account and show an illustration of a hypothetical IFMA account that was opened 5, 10, 15, and 20 years ago given the asset and liability classes or characteristics selected by the client.

In step 315, if the client does not request further information, the access by the client is terminated in step 320. Else, in step 325, a high level overview of IFMA accounts is presented to the client in step 325 so that the client can select the IFMA modules of interest in step 330.

Figure 3A:
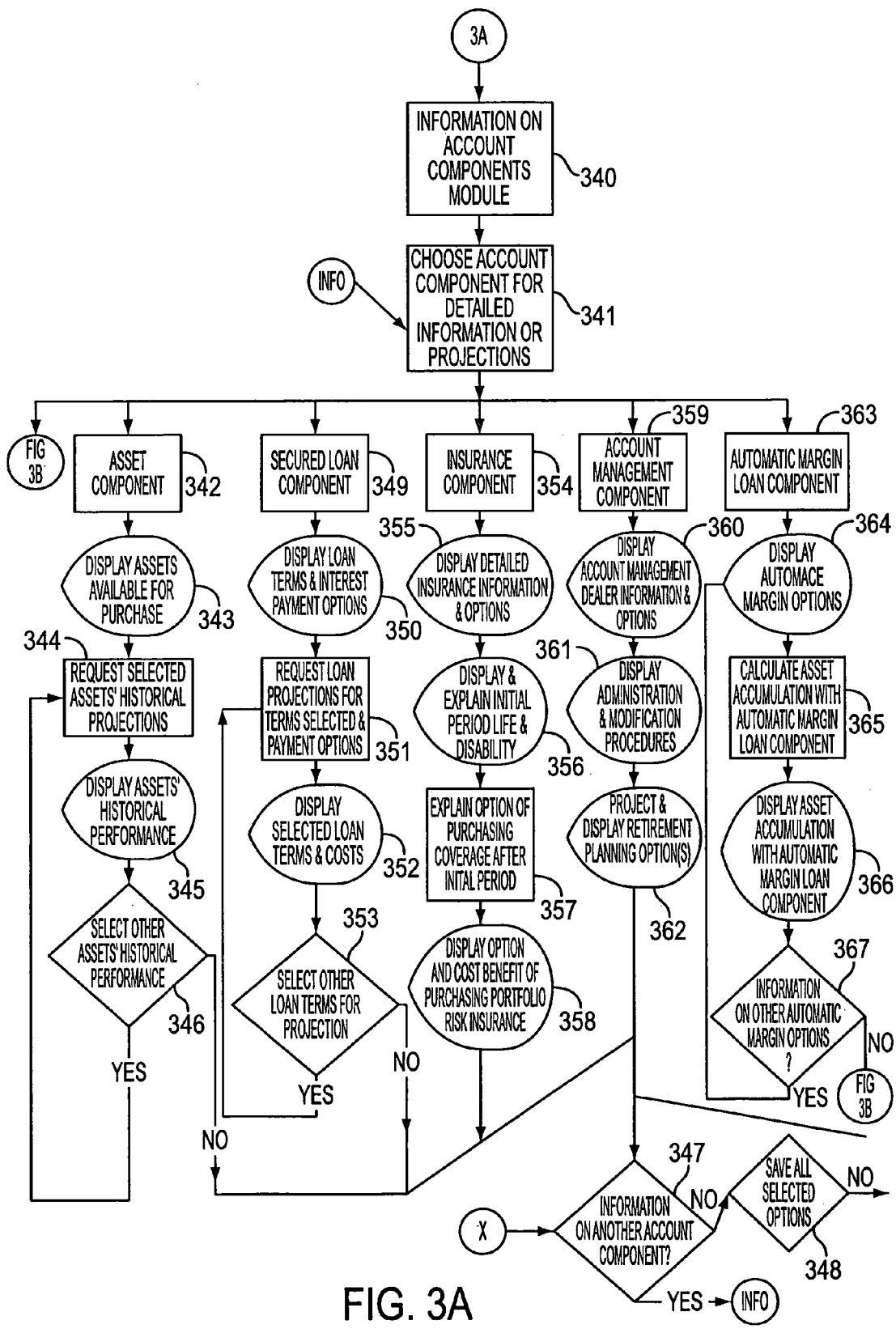
FIGS. 3A–3B are flow diagrams showing the preferred embodiment of the processes of the information component of the Integrated Financial Management Account according to the present invention.

If the client selects the IFMA information module, then step 335 invokes the information module to proceed to step 340 shown in FIG. 3A. If the client selects the financial projections module, then step 336 invokes the steps discussed further herein with respect to FIGS. 4A–4E. If the client selects the account opening module, step 337 invokes the steps discussed further herein with respect to FIGS. 5A–5I.

With reference to FIG. 3A, the processing proceeds to step 341 in which the client chooses the account component of interest so that information about the relevant account component can be displayed. If the client chooses the asset component, information relevant to the asset component is provided in steps 342–346. More specifically, the steps 342–346 provide information on the investment asset component. The client may receive information about a limited number, e.g. 6–8, investment funds offered in the account. Of course, the present invention also contemplates, in alternative embodiments, that other financial assets may also be offered for purchase as an investment asset. Each one of these individual investment alternatives, Fund 1 to Fund n, can be selected and detailed information about the fund provided, as well as its historical performance over any selected number of years as specified by the customer.

Examples could calculate and display how fixed investment amounts, such as, $10,000, $25,000, $50,000 and $100,000, appreciate if historical levels of the selected fund's past performance are achieved in the future. Fund 1 to Fund n could be mutual funds or index funds or a mix of investment funds that provide combinations such as pure equity, mixed equity and debt, and sector funds. For specific calculated projections of an amount of investment to be allocated among the available funds, the customer is referred to the Financial Projections Module discussed further herein with respect to FIG. 4A. The results of the Fund's past performance projected into the future from step 346 can be displayed or printed out at the customers choice or transferred to the Financial Projections Module 336 for later use.

In step 346, control may pass back to step 344 to provide historical projections of other assets. Otherwise, control passes to step 347 to determine if the client is interested in another account component. If so, control returns to step 341 so that the client can select another account component. If not, control returns to step 315 (in FIG. 3) so that the client can request more IFMA account information or close his access session to the IFMA system.

Steps 349–353 display information relevant to the secured loan component of the IFMA account. Referring more specifically to steps 349–353, the client receives information relating to the loan component, for example, information about the terms and conditions of each type of the home equity loans available, their terms, amortization options, conditions, and potential interest rate options. These include, for example, certain interest accrual options, or other interest payment options that relate to the calculated projected value of the investment funds in the account. The information and selections used in the loan module can be displayed or printed out at the clients choice. The home equity loan terms selected can also be selected and saved for use in the Financial Projections Module 336.

Steps 354–358 display information relevant to the insurance component of the IFMA account. Referring more specifically to the 354–358, the client receives information regarding the different insurance options provided with an IFMA account. For example, the client may receive the information about the terms and conditions of each of the insurance components available in the account. First, the automatic life, accidental, death, and disability insurance component for one year will be explained and illustrated for the amount of the home equity loan that the customer is contemplating. Second, the option to purchase additional life, accidental death and dismemberment insurance for the amount of the loan in the account will be demonstrated. Third, the option and cost of purchasing portfolio insurance to protect against a decline in the value of the asset component of the IFMA account up to the outstanding balance of the loan, including interest, will be displayed, explained and demonstrated for various loan balances.

As discussed earlier herein, the insurance component of the IFMA also contemplates the use of other financial contracts and derivatives that guarantee or reduce the risk of repayment of the loan in the loan component of the IFMA. Furthermore, these risk reduction options can relate to the entire balance outstanding on the loan component or may relate to a residual value of the loan component after the investment assets have been liquidated together with any collateral pledged to secure the loan. Therefore, in an alternate embodiment of the present invention, the various options and projections relating to these financial contracts that reduce the risk of the loan component may also be displayed.

Steps 359–363 display information relevant to an account management component of the IFMA account. Referring more specifically to steps 359–361, the client is provided with the options to manage the IFMA account. For example, the client may receive the information about the terms, conditions, and opportunities to access the account 24 hours a day 7 days a week to modify it or terminate it. This information explains how the client can buy and sell assets among the index funds or other investments offered in the account to reallocate their investment asset mix, and within prescribed terms modify the terms of the home equity (or other secured) loan, including, for example, changing the interest rate, amortization schedule, method of payment and adjusting the interest rate on the loan to offset other administrative management fees to increase the proportion of the customers cash payments that are deductible for individual income tax purposes. These selections can be displayed, printed out or carried into the Financial Projections Module 336.

In step 362, information will be provided regarding the principal options for transferring qualified investment assets between and among designated beneficiaries for retirement planning. A number of possible options may show how each client can design their own program by selecting timing, asset values, number of beneficiaries, or other customer specified criteria. The Retirement Planning Module in step 362 may also calculate using standard algorithms the before and after tax consequences of certain retirement planning options. In addition, the Module would calculate and display the possible use of a trust account and the benefits of utilizing it. This information can be displayed, printed out, or carried over to the Financial Projections Model 336.

Figure 3B:
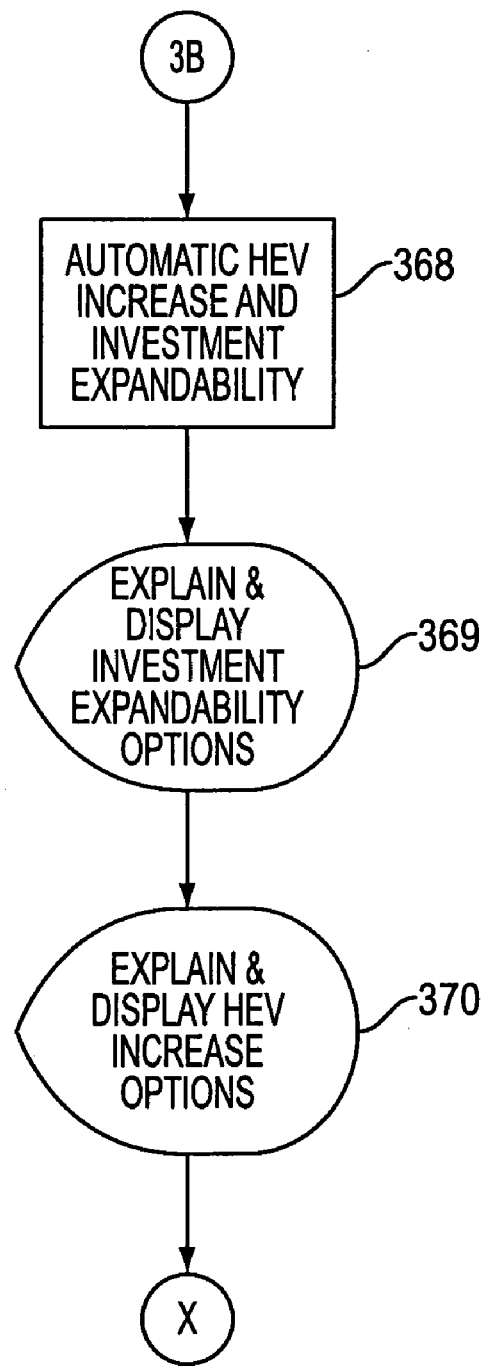

Steps 363–367 display information relevant to the automatic margin loan component of the IFMA account. Steps 368–370 (shown in FIG. 3B) display information relevant to automatic increase of the home equity line (other loan secured by other qualified assets) and the corresponding increase in the investment component based on the additional loan granted based on the increase of the home equity value.

Referring more specifically to steps 363–370, the client may receive the information about the terms and conditions of the IFMA accounts' automatic home value increase loan or margin loan components. Under this option, the client may learn how they can automatically agree to increase their loan and investment as the house or security increases in value, and also incur a margin loan for qualified investment fund securities in the IFMA account that are above a qualified level in addition to the increase in home equity loan based on an increase in the value of the home. Under this option, the IFMA account may automatically increase the home equity or margin loan amount and purchase additional investment funds specified in the customers current asset allocation mix with the proceeds of the increased loans. These options may be illustrated with examples of additional home equity loan or margin loan dollar amounts invested in investment funds and the excess assets borrowed on margin, and the combined returns calculated and displayed. This information can be displayed, printed out, or carried over to the Financial Projections Module 336.

FIGS. 4A–4E show the steps of the preferred embodiment of the financial projections module 336. As shown in FIG. 4A, step 400 displays a menu for the financial projection module, so that a user can make a selection from the menu in step 401. The exemplary menu options selectable by a user include (i) selecting assets for projections (step 402); (ii) selecting loan terms for projections (step 403); and (iii) input personal assumptions (step 404). The personal assumptions input can include providing certain information such as age, tax rates in current state, amount of money the customer is considering investing, and the like, so that the financial projection module can customize its responses based on a client's information.

Thereafter, in steps 405 and 406, the financial projections module calculates the IFMA account performance with or without the automatic margin loan feature. In step 407, the financial projections module displays the account performance with or without the automatic margin loan feature. In steps 405 to 407, the account performance is calculated based on a projected growth of an investment asset selected by a client. Appropriate federal and state taxes can be factored into calculating the projected growth of the investment assets. The automatic margin loan feature provides that an additional loan may be calculated and provided in the loan component of the IFMA corresponding to specified increases in the projected values of the investment assets. The additional margin loan provided against the increases in the value of the investment asset can then be reinvested/added the investment component of the IFMA to purchase any allowable combination of permissible investment assets by the client.

Figure 4:
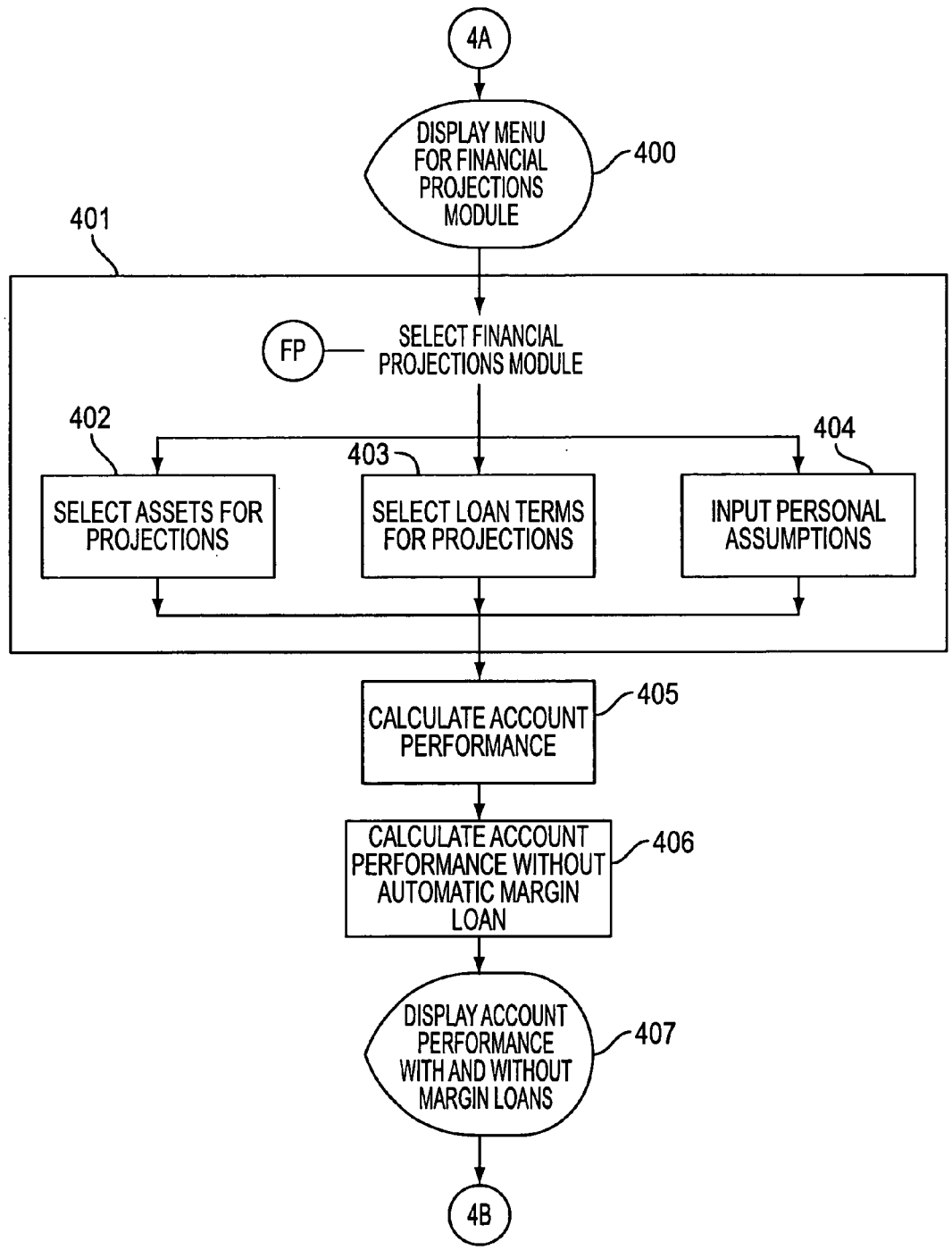
FIGS. 4A–4E are flow diagrams showing the preferred embodiment of the processes of the financial projection component of the Integrated Financial Management Account according to the present invention.
Figure 4B:
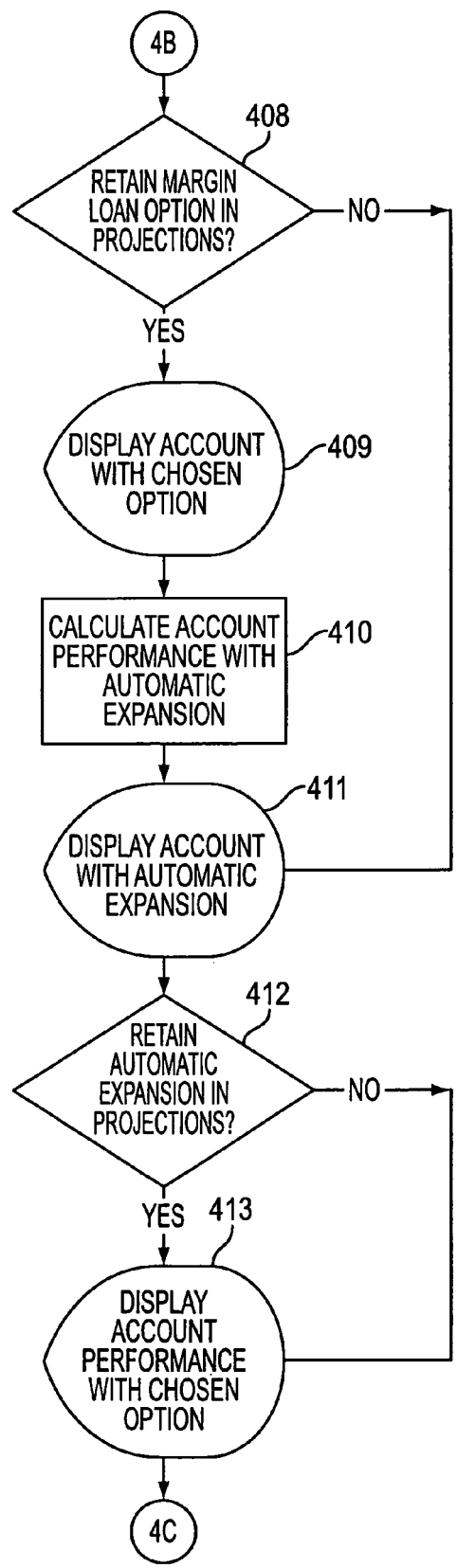

As shown in FIG. 4B, steps 408–413 show financial projections with the automatic loan expansion feature of the present invention. The automatic expansion feature calculates and provides an additional loan to the loan component of the IFMA corresponding to specified increases in the value of the collateral pledged to secure the loan component. Therefore, if the loan component of the IFMA is secured by a second mortgage on a home, an additional expansion loan is calculated and provided if the value of the home increases by a specified amount or a specified percentage.

Figure 4C:
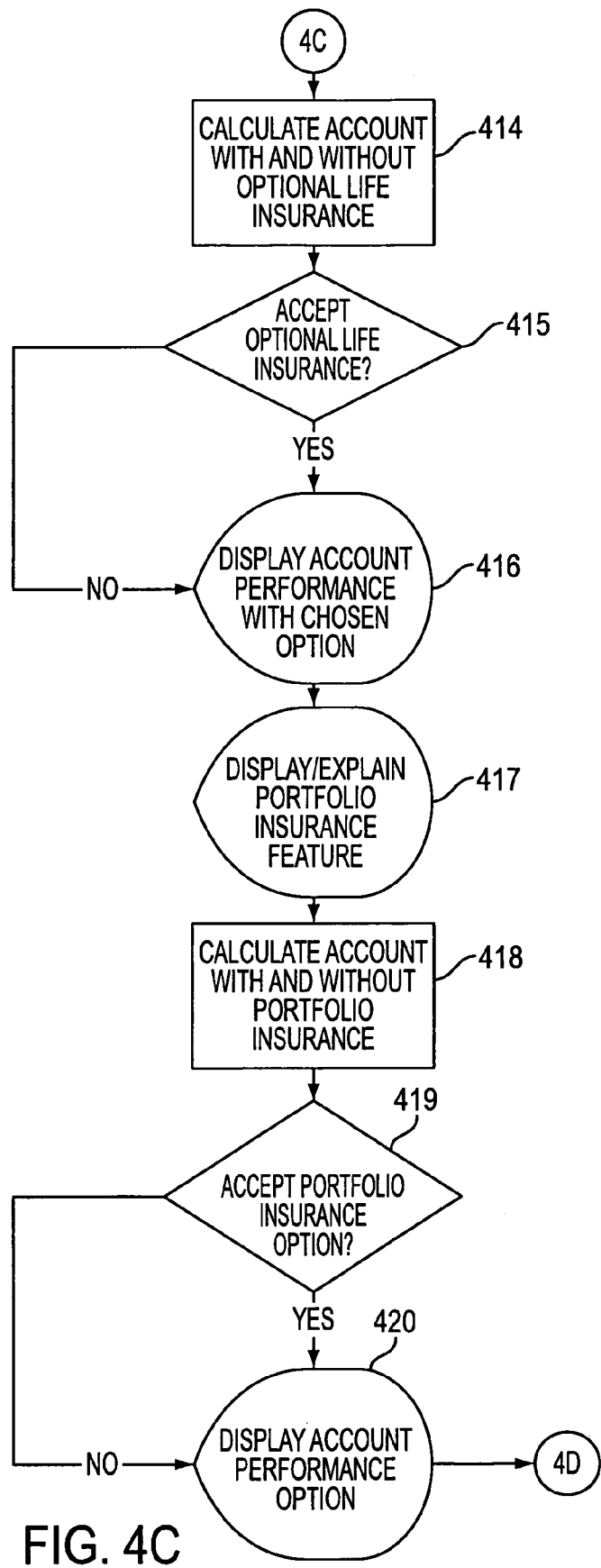

As shown in FIG. 4C, steps 414–420 show the financial projections performed based on the different insurance options provided by the IFMA account of the present invention. For example, the client would be offered the option of paying for additional life and Accidental Death and Dismemberment (AD&D) insurance beyond an automatic coverage period, which the client can accept, decline, or wait until it is priced out with the cost of the loan, e.g. paid for with a higher interest rate to maximize the tax deductible nature of the payments, i.e., making the cost of the insurance tax deductible by increasing the interest rate. The current IFMA status would be calculated and displayed after each change.

As shown in steps 417–419, the client would be offered the option of purchasing portfolio insurance against a decline in the original amount of the investment asset value. The client will be provided with the option of accepting, declining, or waiting until the insurance is priced out with the cost of the loan, i.e., making the cost of the portfolio insurance tax deductible by increasing the interest rate. The IFMA account status would be calculated and displayed after each relevant change.

As discussed earlier herein, at this stage the client could also be shown, in an alternative embodiment, financial projection based on selecting other financial contracts, such as guarantees or hedging transactions or derivatives, that might be used to reduce the risk of repayment of the balance outstanding on the loan component of the IFMA account. Furthermore, such a risk management financial contract may extend to a residual value of the loan balance rather than the entire balance of the loan component because the present invention provides a triple security for the loan in loan component of the IFMA. That is, the present invention provides that the loan in the loan component is secured by at least the following three means: (i) the collateral pledged to secure the loan (such as a house); (ii) assignment of the investments assets in the investment component purchased using, for example, the proceeds of the loan; and (iii) the financial contract or insurance that guarantees either a residual value or a whole value of the loan balance outstanding. Accordingly, steps 417–419 can also be used to make financial projections using these alternative financial contracts instead of insurance or could be based on a suitable combination of the two.

Figure 4D:
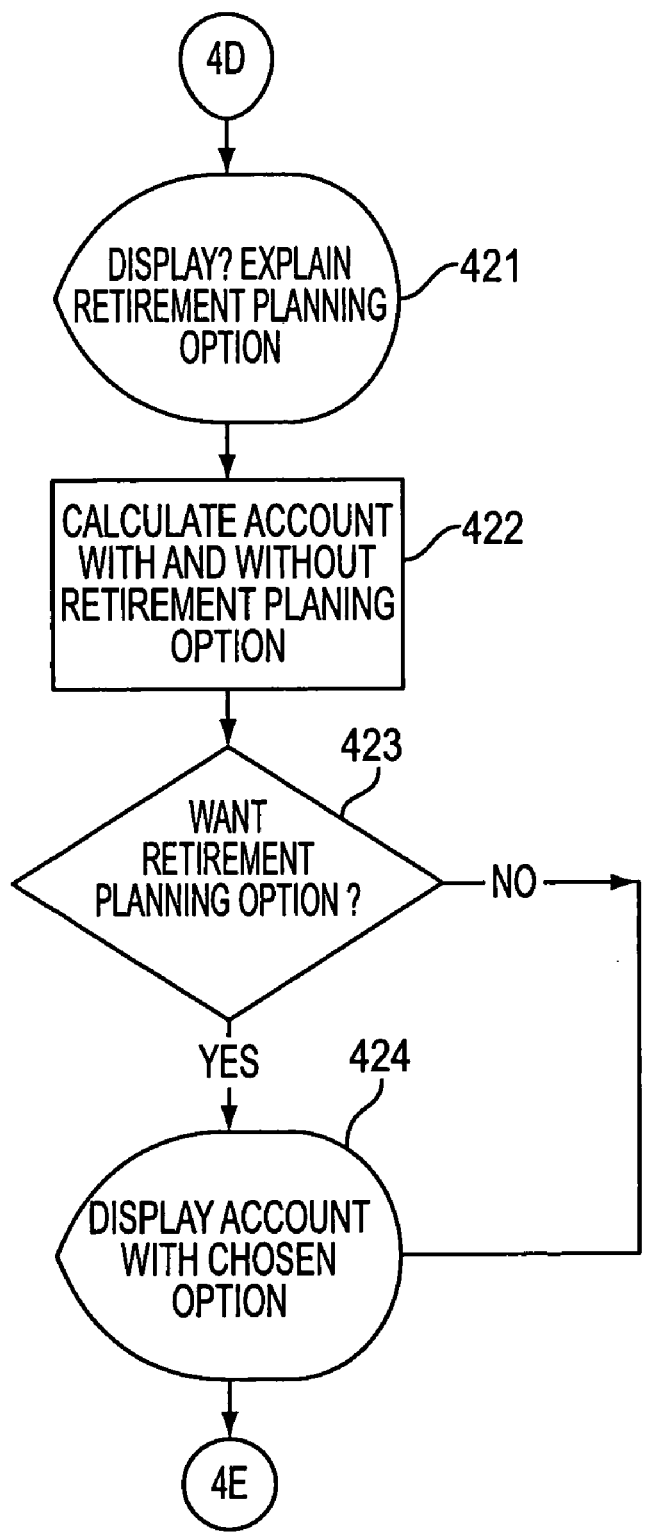

As shown in FIG. 4D, steps 421–424 show that the client is offered various retirement planning options in step 421. In step 422, the IFMA account value is calculated with the retirement planning options selected by the client. For example, the client would be offered the option of purchasing a retirement planning option to transfer automatically qualified portions of the investment funds on a regular basis to designated beneficiaries, e.g. children or universities. Thereafter, the IFMA account status is displayed in accordance with the client's instructions in steps 423 and 424.

Figure 4E:
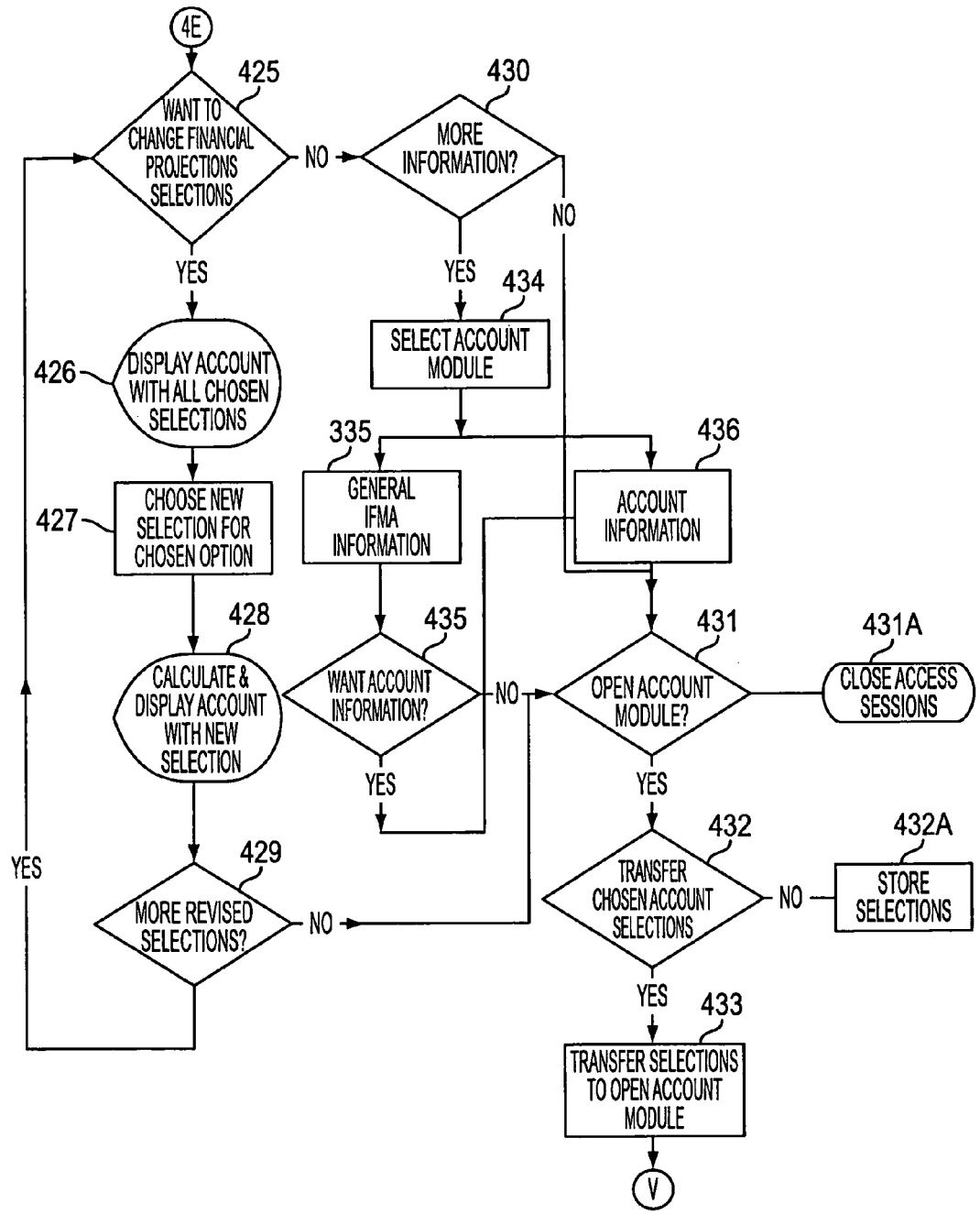

As shown in FIG. 4E, once all the financial planning projection options have been presented to the client, the client is offered the option to change any of the financial projection options in step 425. Thereafter, in step 426 the IFMA account is displayed with the current options selected by the client including any options changed in step 425. In steps 427–429, the client is provided further opportunities to refine the financial projections by recalculating the IFMA account based on options changed by the client.

In step 430, the client has the option of obtaining more information or transferring to the account opening module 337 in step 431. The client can then choose to transfer his chosen selections to the open account module in steps 432 and 433 or close the access session in step 431A. Alternatively, the client can choose to store account selections in step 432A.

If the client wants more information in step 430, the client is offered a selection menu to select an account module in step 434. In step 434, the client can choose to enter either the general information module 335 (as shown in FIG. 3) or get account information in step 436 that leads to an option of accessing the account opening module 337 through the option presented in step 431.

Figure 5A:
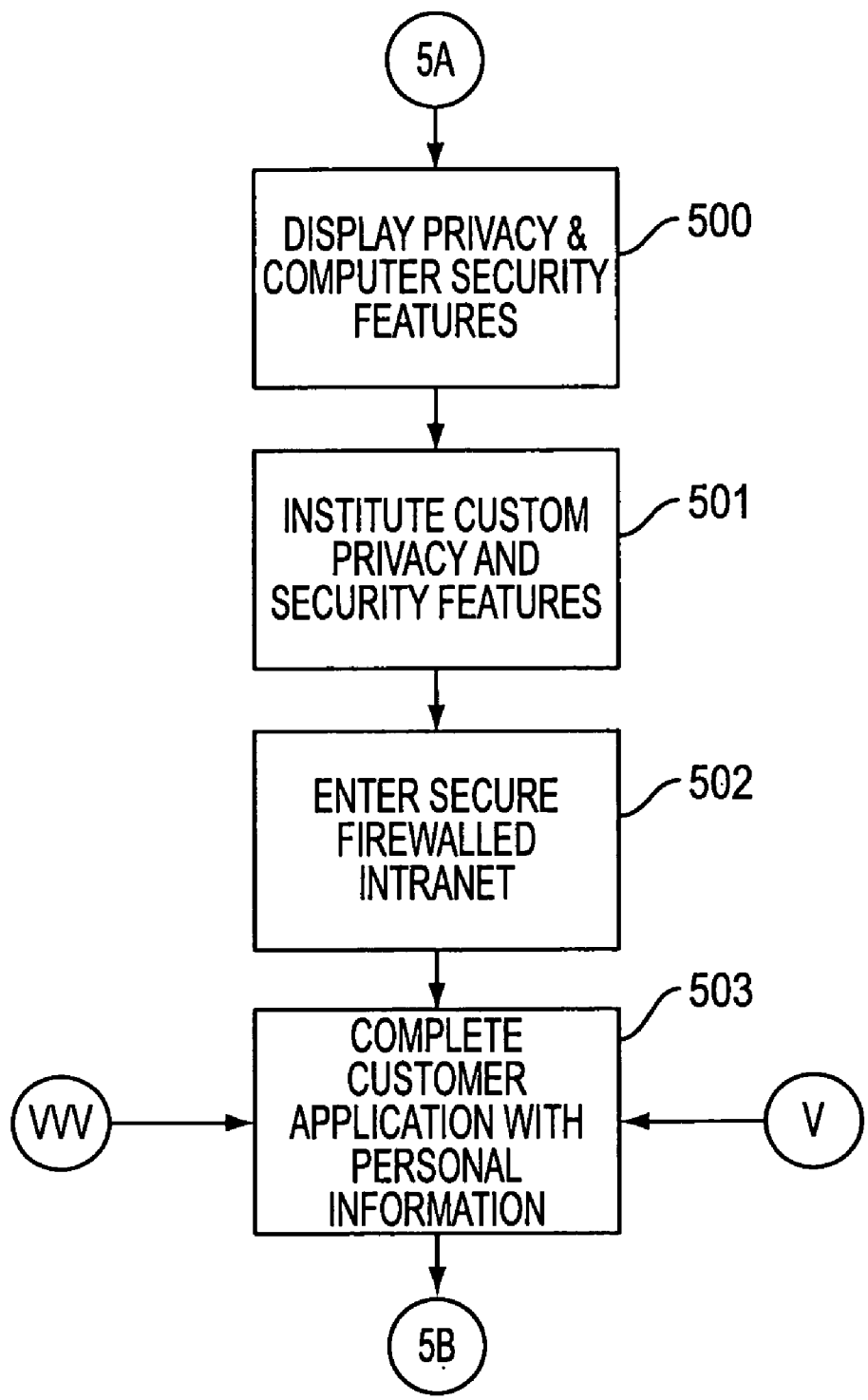
FIGS. 5A–5I are flow diagrams illustrating the preferred embodiment of the account opening component of the of the Integrated Financial Management Account according to the present invention.

FIGS. 5A to 5I show the steps of a preferred embodiment of the account opening module 337 and describe and outline the process of opening the IFMA account. As shown in FIG. 5A, in steps 500 to 502, the security, authentication, and privacy features of the IFMA account are presented to the client so that the client is able to access the IFMA account in a secure mode. The IFMA account is provided in a secure computer system that is protected by a firewall and appropriate security features on both the firewall and on the computer system hosting the IFMA account. These security features include encryption, authentication, filtering and other techniques that are known to one skilled in the art.

Regardless of the interface used, the account opening process may be initiated de novo by beginning the client access at account opening module 337 or by transferring from the general information module 335 or the financial projection module 336 to account opening module 337. If transferred from elsewhere in the system, then the client's personal information, already entered by the client, is displayed along with the appropriate customer options selections. If beginning de novo, a template to acquire the client's personal information is displayed for completion in step 503.

Figure 5B:
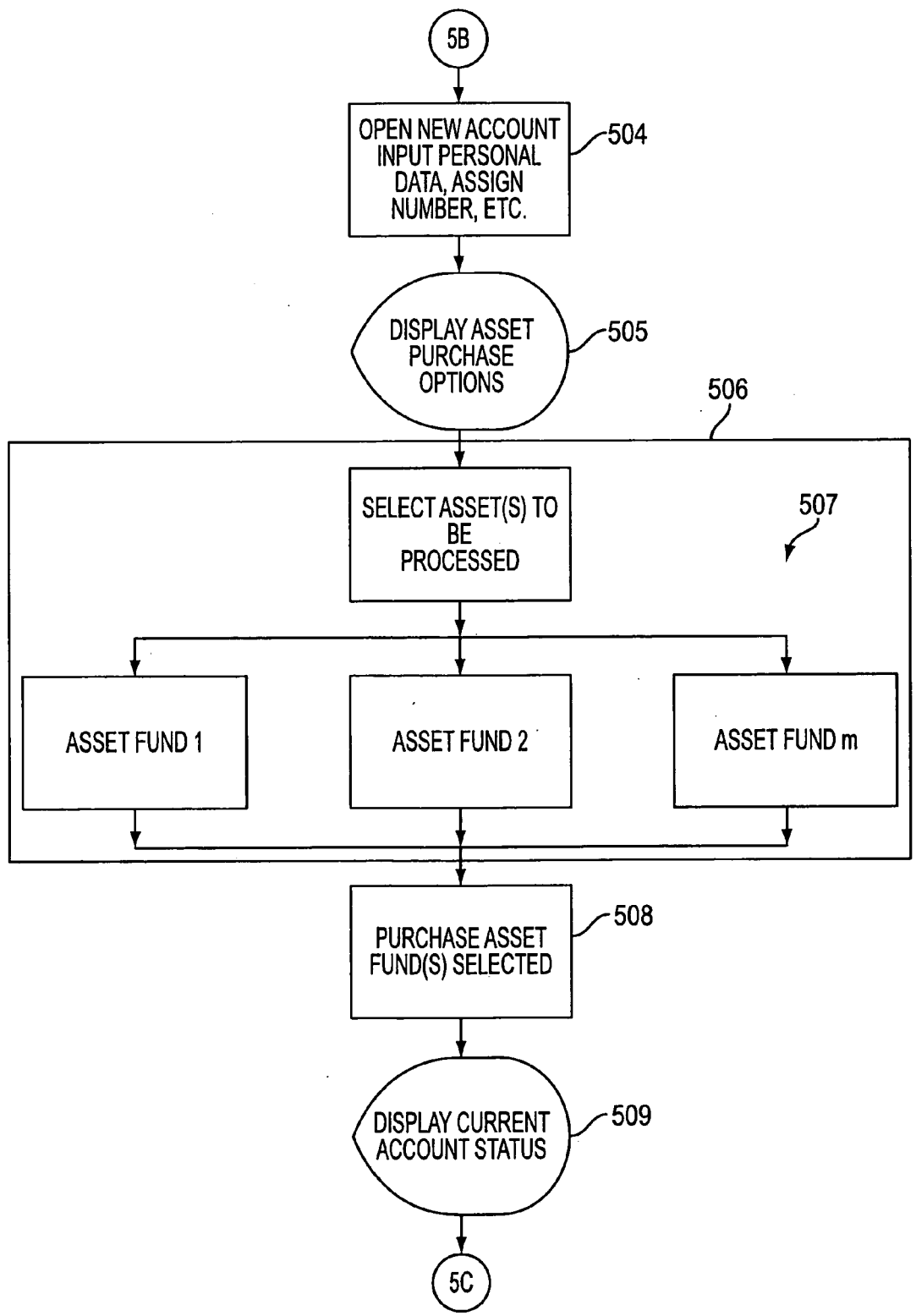

As shown in FIG. 5B, the new IFMA account is opened in step 504. In the first preferred embodiment, the IFMA account opened at this stage is referred to as a "shell" account because the client may not eventually qualify for a loan in the loan component of the IFMA account. On qualification, the proceeds of the loan component are used to fund the investment assets in the investment component of the IFMA account. In step 505, the client is offered asset purchase options for assets to be credited to the client's investment component so that the client can profit from any appreciation in the asset value right from the date of opening the IFMA account. The client selects among the asset options 507 in step 506 so that the selected assets are purchased in step 508. It should be noted that although the client has an interest in the appreciation of the asset from the date of opening of the account, the assets are purchased by the IFMA account sponsor (also referred to as "provider") and are owned by the IFMA account sponsor until the client's loan is disbursed in the loan component and the disbursed funds are used to fund the investment assets selected in the investment component of the IFMA account. The account status after the purchase of the investment assets are displayed in step 509.

In an alternative embodiment, a second preferred embodiment, the investment assets are not purchased until the loan has been granted in the loan component of the IFMA account. Therefore, the client applies for the IFMA account using one set of account opening procedures and documentation. Based on this one account opening procedure, the IFMA account is set up for the client to have both the loan component and the investment component together with an optional insurance component which serves to reduce the risk of repayment of either a whole or a residual value of the loan balance outstanding in the loan component. As discussed earlier herein, the insurance component includes any suitable mechanism that reduces the risk of repayment of the loan balance and includes suitable financial contracts and guarantees in addition to more conventional insurance products.

Therefore, in this alternative embodiment, the IFMA account is set using one account opening procedure that sets up the loan component, the investment component and any optional insurance components. In this alternative embodiment, the investment assets in the investment component are only purchased using the proceeds of the loan after the loan has been granted in the loan component. This alternative embodiment of the IFMA account is characterized also by the fact that the loan balance in the loan component is secured by at least three ways: (i) one or more securities pledged to secure the loan; (ii) assignment of the investment assets purchased in the investment component; and (iii) the insurance or other financial contract provided in the insurance component of the IFMA as discussed below with respect to FIGS. 5C and 5D.

Figure 5C:
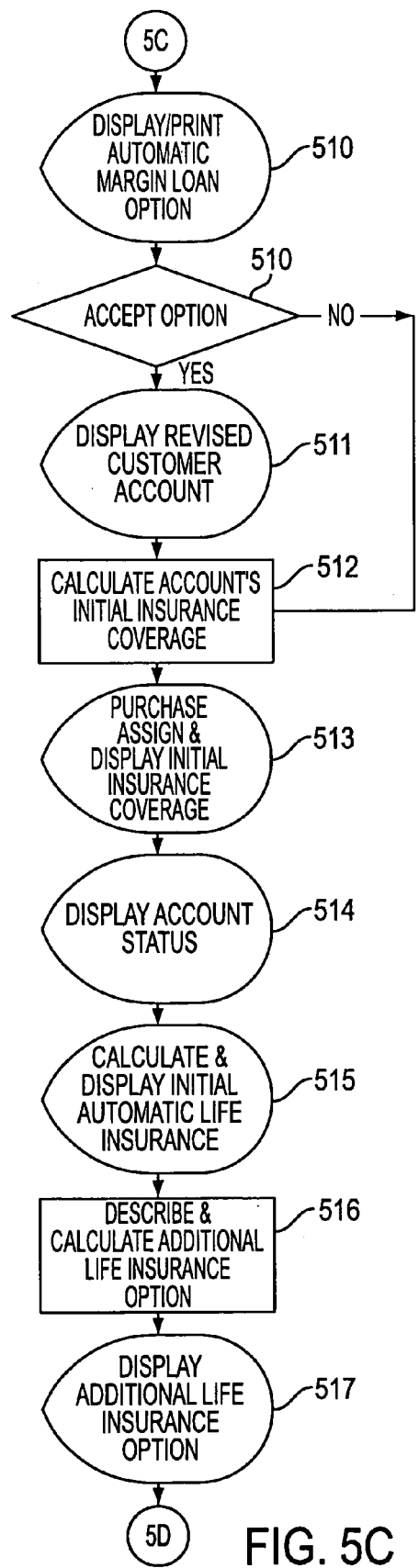
Figure 5D:
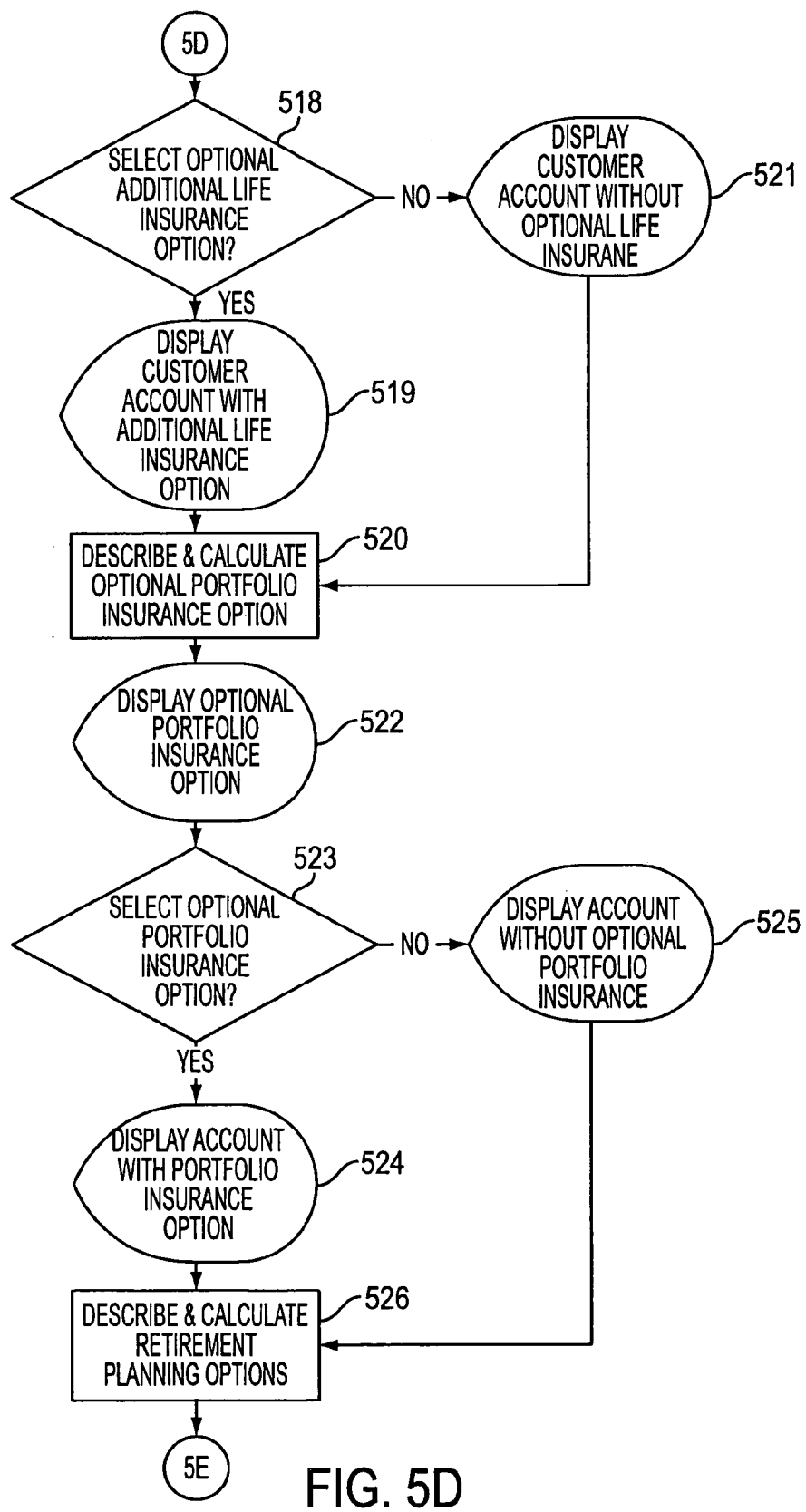

In the first preferred embodiment, thereafter, as shown in FIGS. 5C and 5D, the client is offered the option of purchasing and adjusting the various insurance products offered by the IFMA account in steps 510–525. These insurance options are similar to those discussed earlier with respect to the insurance options in the financial projection module 336.

In the second preferred embodiment, steps 510–525 are replaced by an alternate process that automatically provides insurance coverage which may be up to the extent of the loan principal and is arranged or underwritten by the IFMA account provider. Therefore, in this alternate process, the IFMA account provider arranges insurance from an insurance provider and then insures each IFMA account with the insurance provider to the extent of the loan amount. Accordingly, the IFMA account provider aggregates all the loans initiated over a period of time, such as a day, and communicates the aggregate amount to the insurance provider on a periodic basis, such as at the end of each business day. This communication from the IFMA account provider to the insurance provider may be used to activate or initiate some other function with respect to the insurance coverage for the loan in the loan component of each of the IFMA accounts that have their loans initiated. The insurance coverage is valid for a fixed period of time and has an expiry date that is stored, for example, in the insurance component of the IFMA account.

In addition to sending the periodic communication to the insurance provider, The IFMA account provider performs calculations to track the utilization of a predetermined insurance limit for the IFMA provider that has been established with the insurance provider. Therefore, IFMA account provider subtracts the aggregate insurance value from the predetermined insurance limit to create a predetermined insurance limit to be used for a next insurance limit subtraction step for a next predetermined time period. Likewise, the predetermined insurance limit may also be adjusted to account for IFMA accounts that have reached an expiry date and are, therefore, no longer covered under the insurance arranged through the IFMA account provider. In these instances, the predetermined insurance limits may be increased to account for the expired insurance coverages provided they have not been renewed.

Figure 5E:
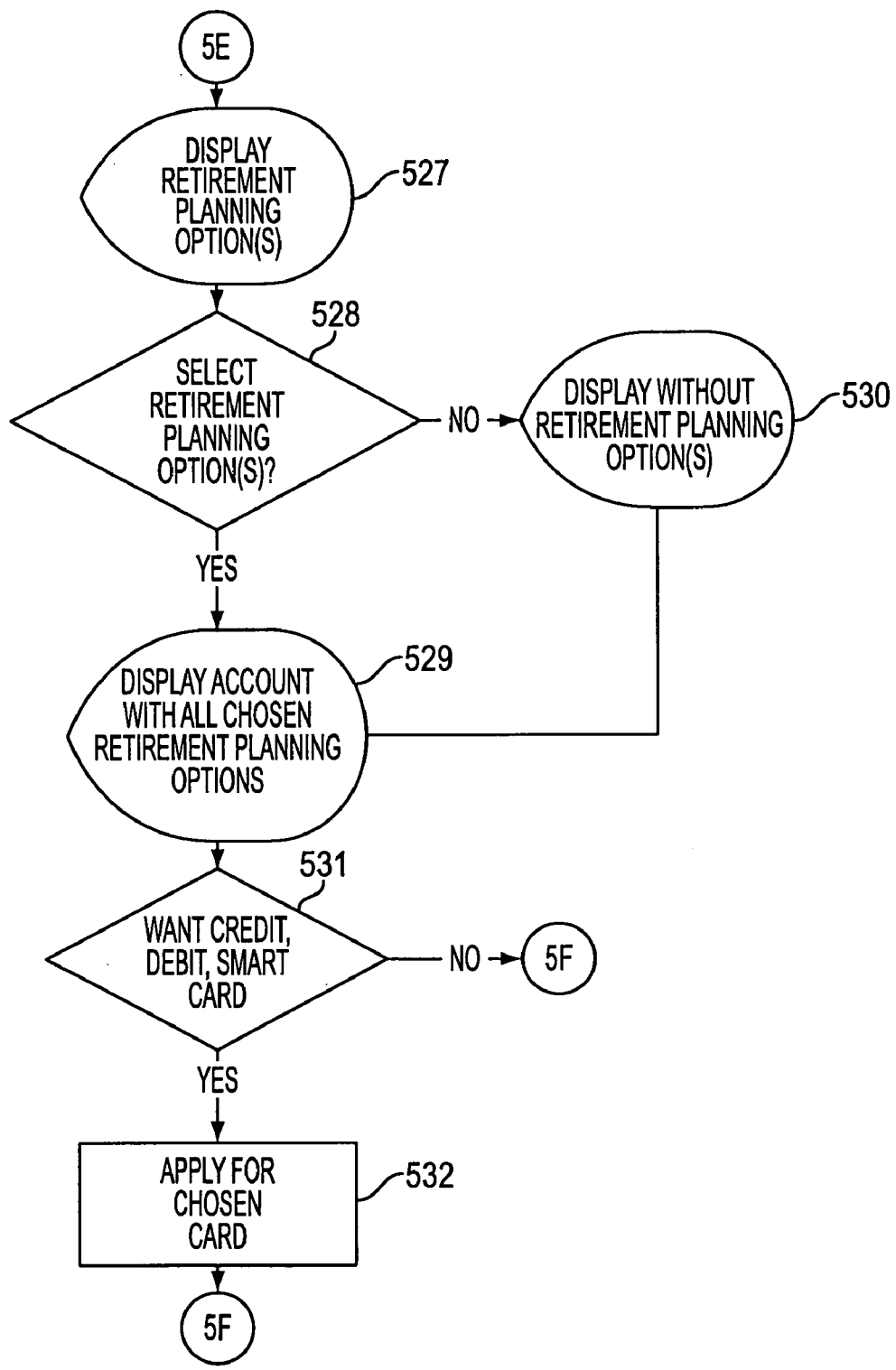

Thereafter, in step 526–530, as shown in FIG. 5E, the client is optionally offered choices for selection of the retirement planning options provided by the IFMA account according to the present invention. These retirement planning options are similar to the retirement planning options discussed above with respect to the financial projections module 336.

In steps 531 and 532, the account opening module 337 optionally offers the client the opportunity to apply for a credit, debit or a smart card as an added feature provided by the IFMA account of the present invention. These cards can then also be used for payment of interest, fees, or other account dues if agreed to by the client.

Figure 5F:
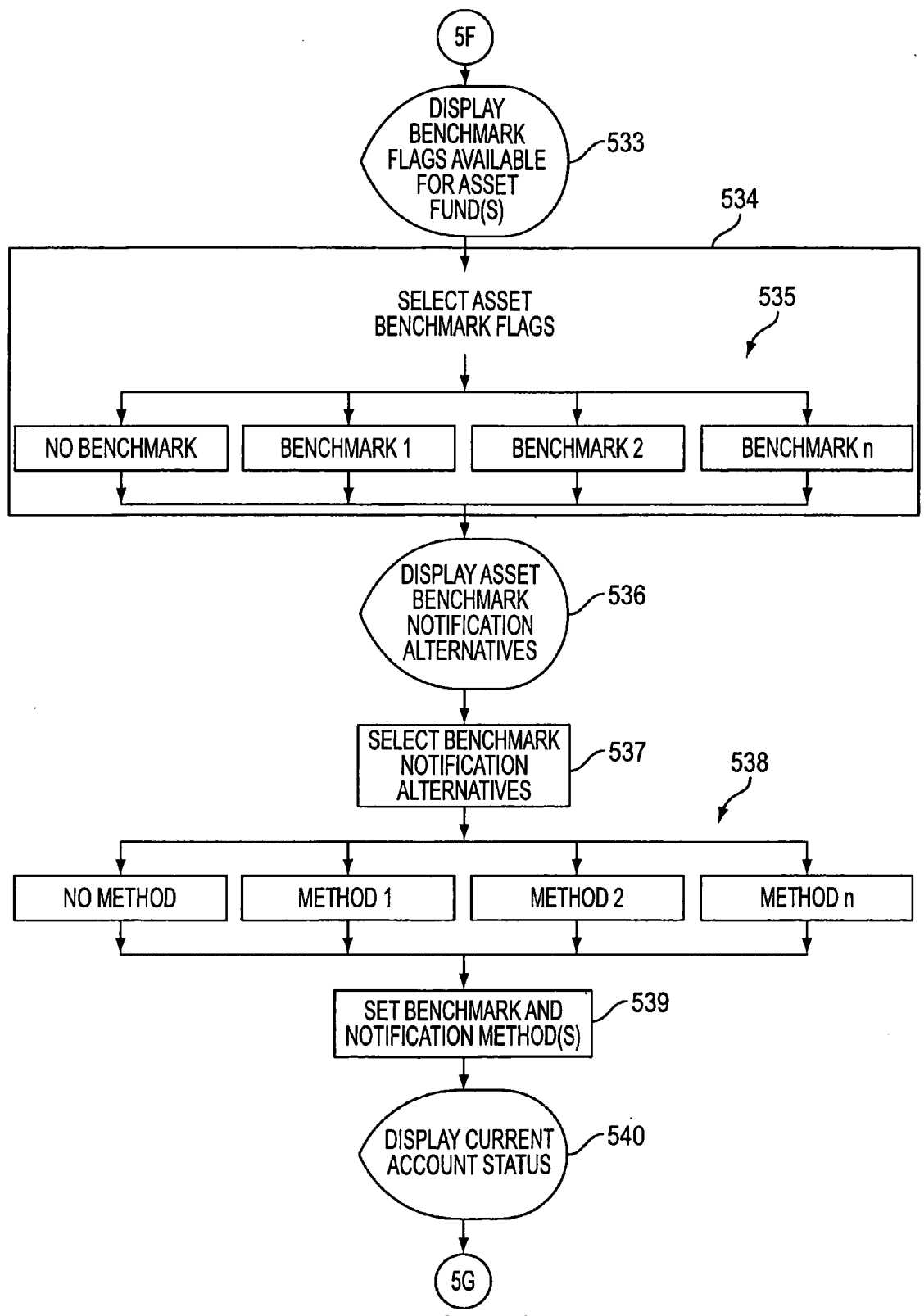

In steps 533–537, as shown in FIG. 5F, the client is offered a selection of benchmarks on the achievement of which the client will be notified by a notification method to be selected by the client. By way of example, benchmarks could be set for the value of a given fund, or for the portfolio as a whole. In step 533, the client is offered a selection of benchmarks that are available as provided by the IFMA account of the present invention. In step 534, the client selects one or more of the benchmarks 535 that are provided as options in step 533. Thereafter, the selected benchmarks are displayed in step 536.

In steps 537–540, the client selects the methods for notification if the selected benchmarks are achieved. Therefore, in step 537, the client selects one or more of the benchmark notification options 538 so that the benchmark selections and notifications are set in step 539. Such options may include, by way of example and not by way of limitation, notification by fax, or telephone or e-mail, or mail, or telegram. The IFMA account status is displayed in step 540 to include the selected benchmarks and notification methods.

Figure 5G:
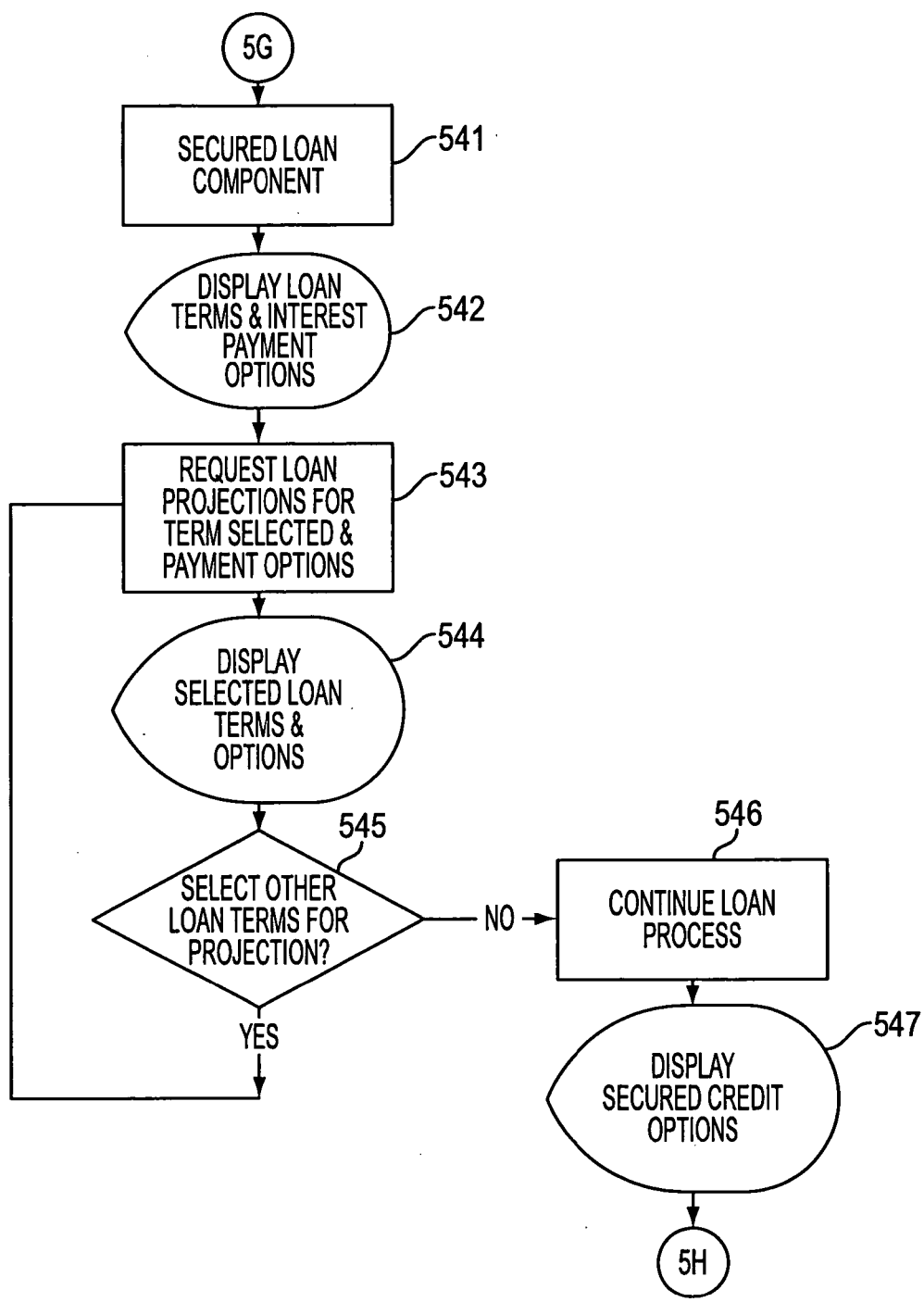
Figure 5H:
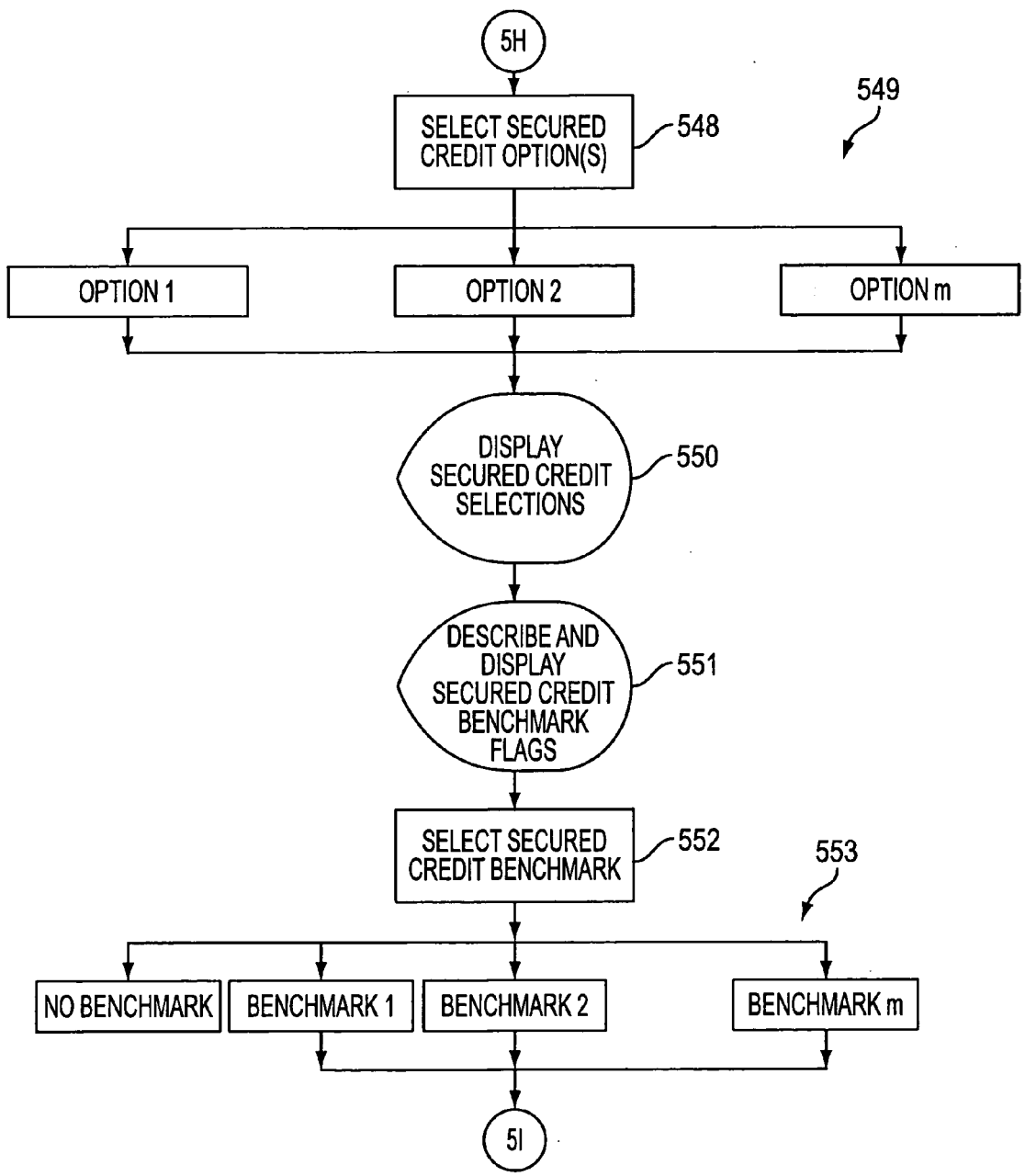
Figures 5I, 6A:
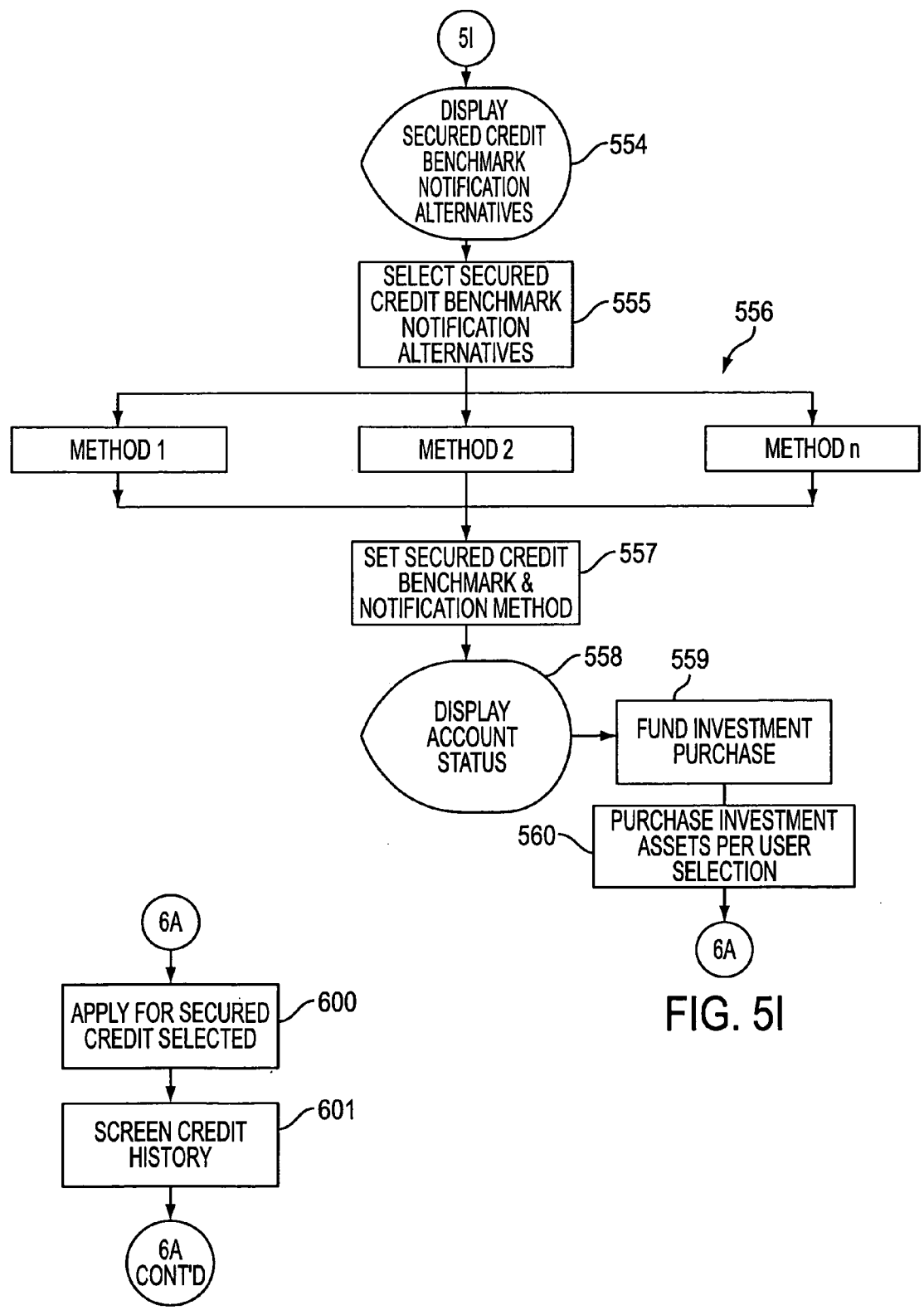
FIGS. 6A–6B are flow diagrams illustrating the processing for loan approval of the loan component of the Integrated Financial Management Account.
Figure 6A:
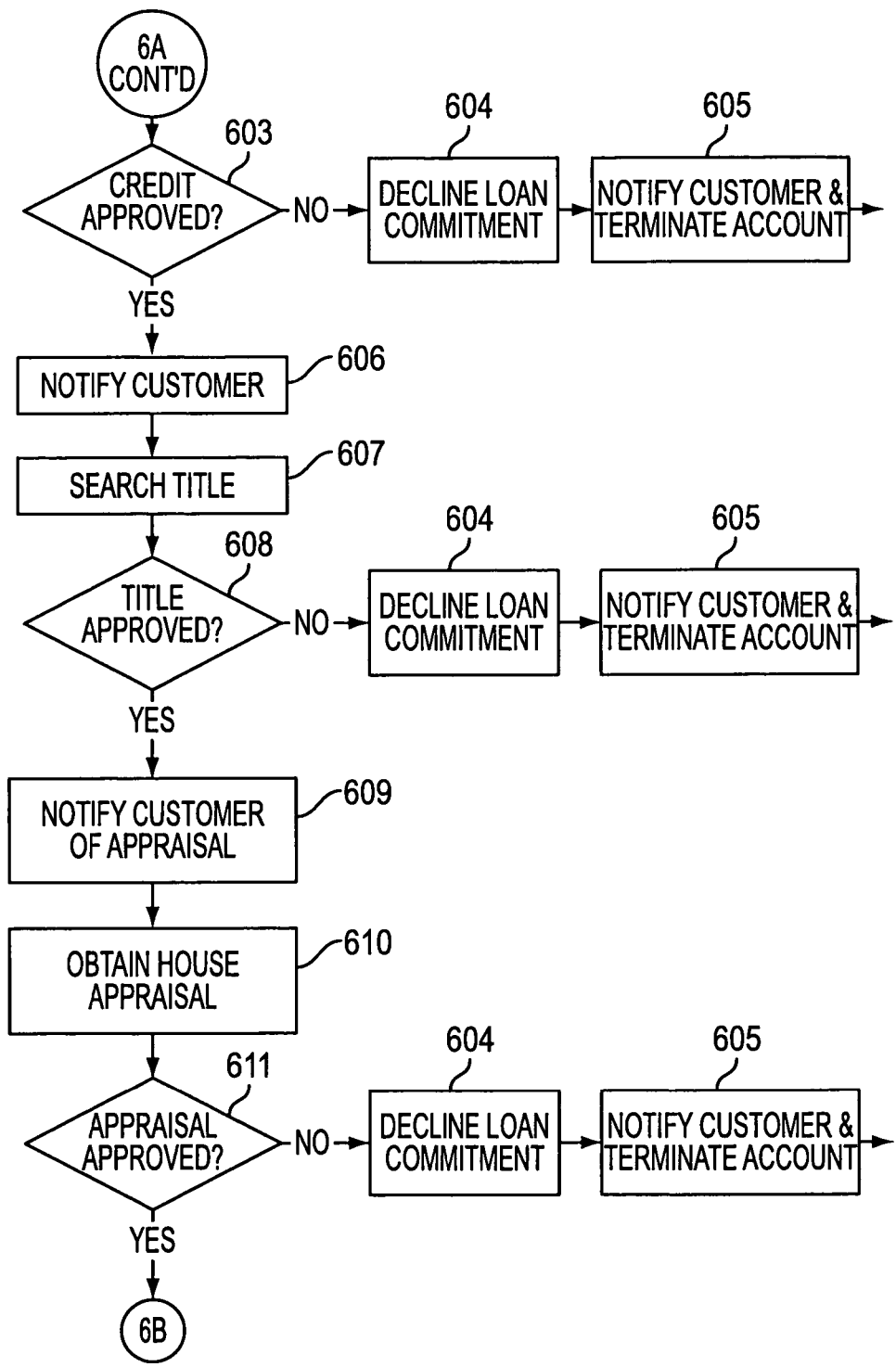
Figure 6B:
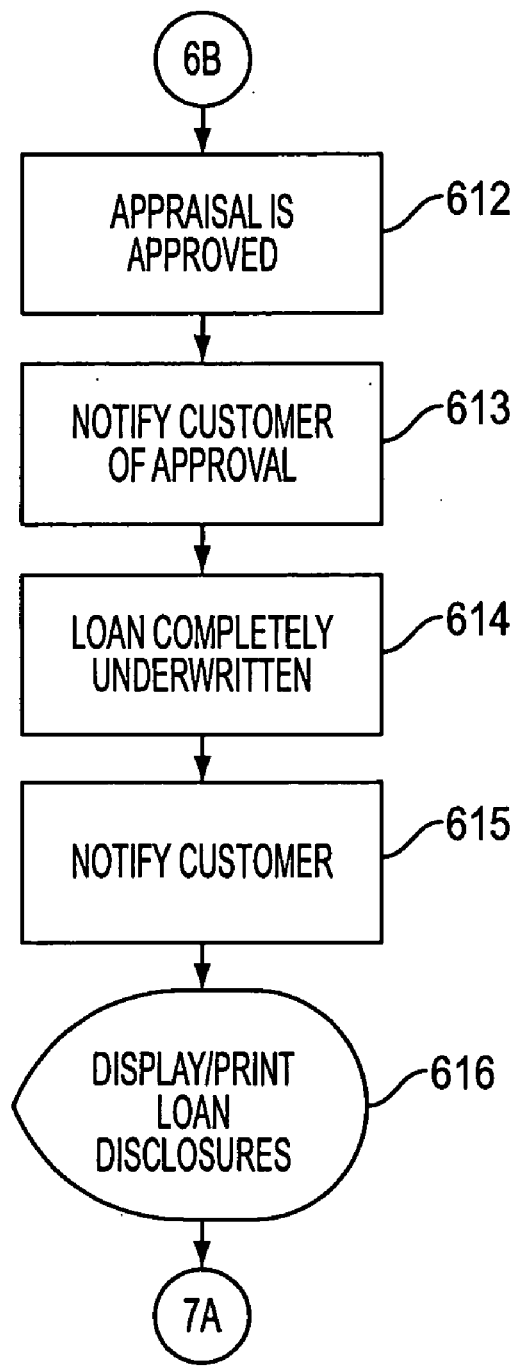

With reference to FIG. 5G, steps 541–547 show the steps in selecting the loan terms and interest payment options in the loan component of the IFMA account in the first preferred embodiment of the invention. It should be noted that in an alternative embodiment, the second preferred embodiment of the invention, the loan terms and interest payment options may be limited or predetermined by the provider of the IFMA account. Therefore, in step 542, the loan term and interest payment options are displayed. In steps 543–545, projections are calculated and displayed interactively to the client for the different loan terms and payment options selected by the client.

Thereafter, in step 547 the different secured credit options are displayed to the client. In step 548 (shown in FIG. 5H), the client selects the secured credit options among the secured credit options 549. In step 550, the selected secured credit options are displayed.

In step 551, the secured credit benchmarks are displayed and described so that the client can select the secured credit benchmark in step 552 from the secured credit benchmark options 553. In step 554, shown in FIG. 5I, the selected secured credit benchmarks are displayed.

In step 555, the client selects the notification methods for the selected secured credit benchmarks selected by the client. The client selects the notification methods from the options 556 and the selected secured credit benchmarks and notification methods are set in step 557. The IFMA account status with the selected secured credit benchmarks and notification methods is displayed in step 558.

In step 559, in the first preferred embodiment, the investment asset to be purchased is funded by the IFMA sponsor so that the investment assets selected by the client are purchased and held by the IFMA account sponsor contemporaneous with the account opening process. It should be understood that the term "contemporaneous" in the present invention applies to all investment assets purchased that are temporally before the approval of the loan in the loan component even if they are temporally after the account opening process is completed.

On successful approval of the loan in the loan component of the IFMA account, the ownership of the investment assets is transferred to the IFMA account's investment component so that ownership (subject to liens) is transferred to the IFMA account holder client at that time. The client is also entitled to any appreciation in value of the investment asset between the date of purchase on the account opening date and the date of approval of the loan in the loan component of the IFMA account.

As discussed earlier, in the second preferred embodiment, the investment assets in the investment components are only purchased with the loan proceeds from the loan component after the loan has been approved and disbursed. Therefore, in the second preferred embodiment, the client does not benefit from any appreciation of the investment assets from the account opening date till the date the loan is approved and disbursed since the investment assets are only purchased using the disbursed proceeds of the loan.

FIGS. 6A–7B show the processing steps performed after a client has requested an IFMA account by using the account opening module 337. In step 600, the process for approval of the loan in the loan component is begun. The credit history of the client is searched in step 601. In a preferred embodiment this search is performed by connection to an on line data base or to a credit bureau service. If the credit is not approved in step 603, based on the credit history, the loan commitment is denied in step 604 and the client is notified and the account terminated in step 605. It is to be understood, that the client is not entitled to any appreciation of the investment asset if the clients loan is declined for any reason whatsoever. Typical processing when the account is terminated in step 605 is discussed further herein with respect to FIG. 11.

If the credit history is satisfactory, the client is notified in step 606 and a title search (or other ownership investigation) is conducted for any collateral provided for the loan in step 607. If the title is not approved in step 608, the loan commitment is declined, the client is notified and the account is terminated in steps 604 and 605. In step 609, the client is notified that the collateral is being appraised and in step 610 an appraisal of the collateral is obtained and the appraisal value date entered in the system. For example, if the collateral is a house, an appraisal of the house is obtained. If the appraisal is not approved, for example, if the appraised value is calculated to be below a threshold level relative to the requested loan, then the loan commitment is declined, the client is notified and the account is terminated in steps 604 and 605.

If the appraisal is approved in steps 611 and 612 (shown in FIG. 6B) the client is notified that the appraisal is approved in step 613 and the loan is underwritten in step 614. Thereafter, the client is notified in step 616 and loan disclosure statements are displayed or printed in step 616 and presented to the client.

Figure 7A:
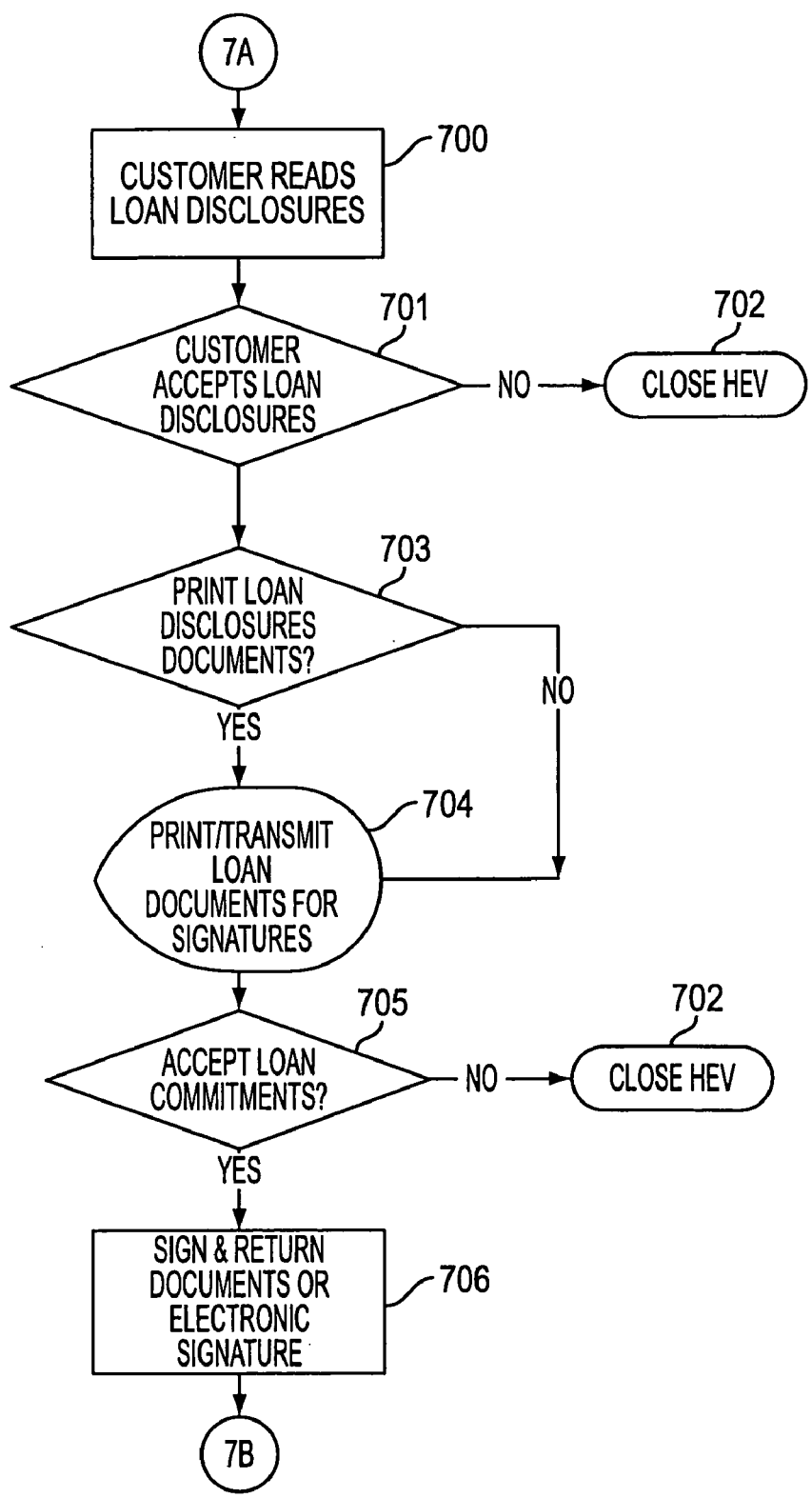
FIGS. 7A–7B are flow diagrams illustrating the booking of the loan component of the Integrated Financial Management Account.

As shown in FIG. 7A, after the client reads the loan disclosures in step 700, the client communicates his acceptance of the loan disclosures in step 701. If the client does not accept the loan disclosures, the IFMA account is terminated in step 702. The steps followed on termination of the account in step 702 are discussed further herein with respect to FIG. 11.

Otherwise, the loan disclosures and the loan documents are printed and mailed or delivered and/or transmitted by electronic means to the client in steps 703 and 704. If the client does not accept the loan commitment in step 705, the IFMA account is terminated in step 702. Otherwise, the client signs and returns the loan documents by either signing a paper copy or affixing an electronic signature using technology that is acceptable to the IFMA account sponsor.

Figure 7B:
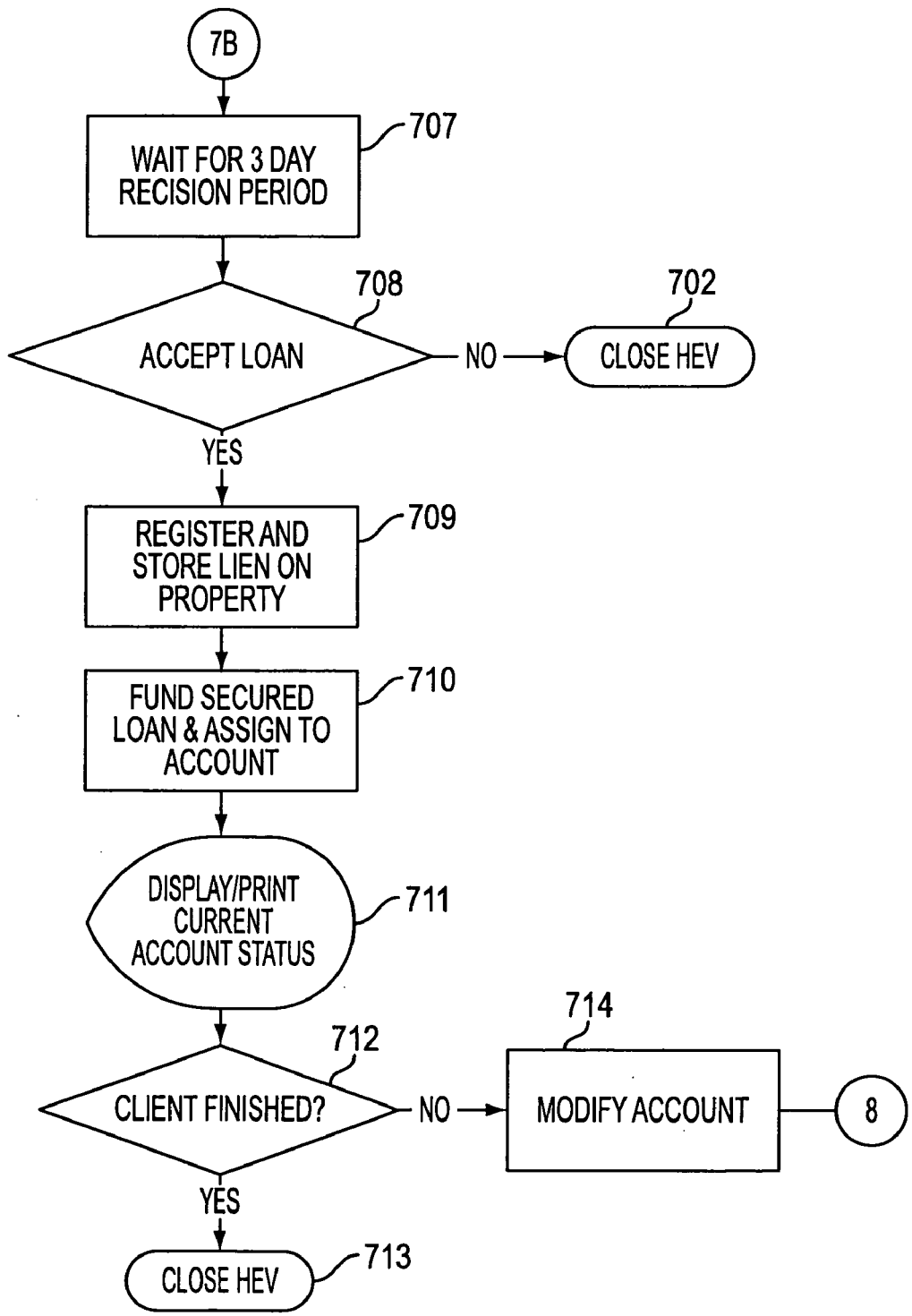

As shown in FIG. 7B, in step 707 the IFMA account sponsor waits for the three day (or other legally mandated) rescission period to determine if the client has accepted the loan in step 708. If the client does not accept the loan, the IFMA account is closed in step 702, otherwise a lien is registered and lien data stored in the system on the collateral, such as a house, in step 709. Thereafter, in step 710, funding is secured for the loan and disbursed/entered to the loan component of the IFMA account. The funds are then transferred to fund the investment component of the IFMA account so that the investment assets purchased are funded by the investment component and the investment assets are now owned in the IFMA account by the client. In addition, as discussed above, in the first preferred embodiment, the client is entitled to any increase in the value of the investment asset in the investment component since the account opening date.

Thereafter, in step 711, the account status is displayed and if the client is finished in step 712 the client interaction is terminated in step 713. If not, control is passed to an interface 714 to a modify account module that is discussed in greater detail with reference to FIG. 8.

As shown in FIG. 8, when the client connects to IFMA account computer system, an account overview menu is presented with options relevant for account maintenance and modification. Also, on connecting to the modify account menu, the client is provided with notification of any benchmarks met or exceeded in steps 801 and 802. If none of the benchmarks have been met or exceeded, no notification is provided as shown in step 803, such as, by displaying a screen confirming that none of the displayed benchmarks have been met or exceeded.

Figure 9:
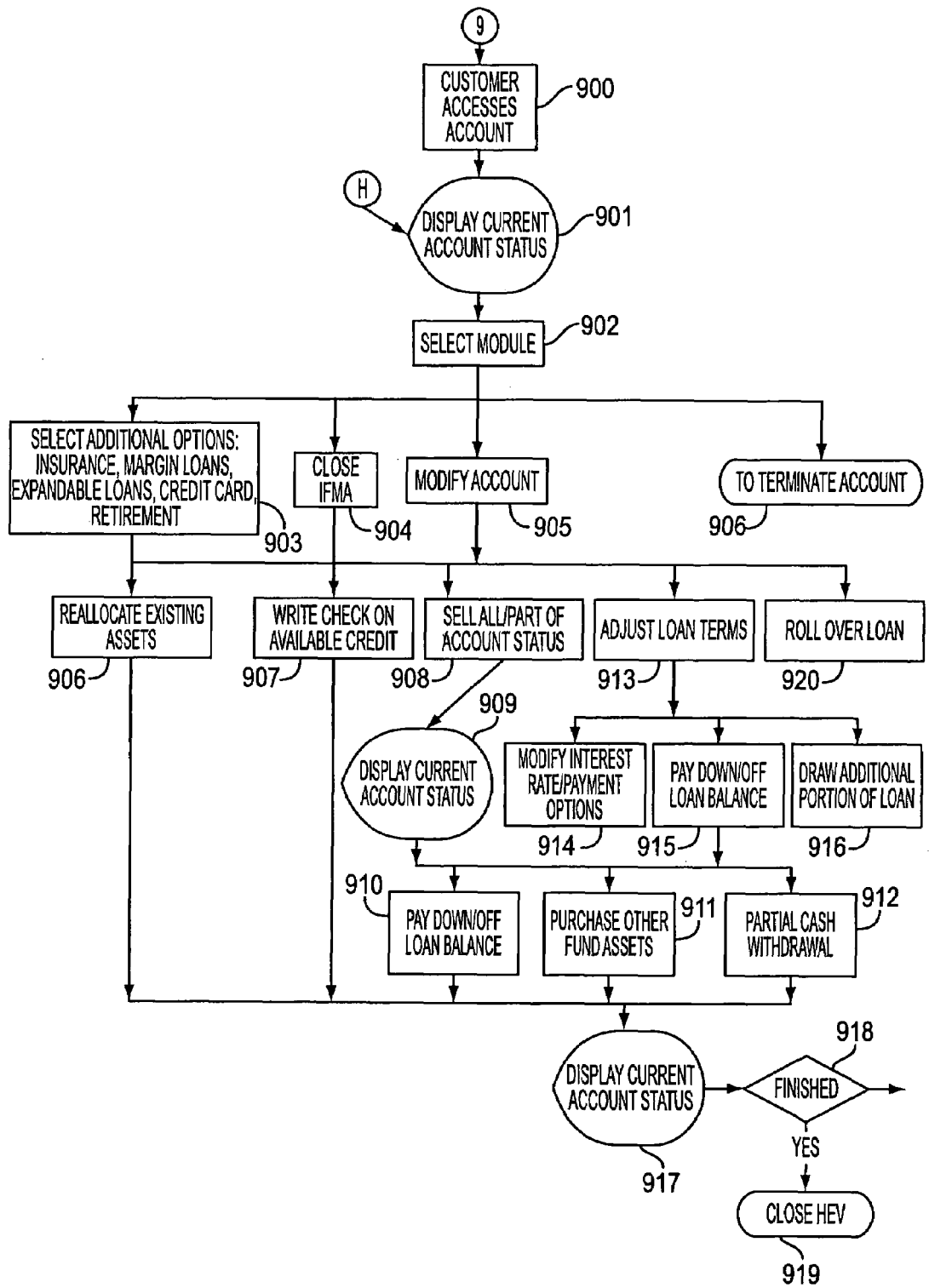

Thereafter, the client accesses the IFMA account in step 900 as shown in FIG. 9. After a current account status is displayed in step 901, the client is provided with several module selection options. These options include, for example, a module 903 for selecting additional options related to insurance (or other similar financial contracts), margin loans, expansion of loan, credit card, or retirement planning. A module 904 permits the closing of the client access session. Another module, 905 provides the options for modifying the existing IFMA account as discussed further herein. Finally, module 906 provides the client with the option to terminate the IFMA account as discussed further herein with reference to FIG. 10.

The modify account module 905 provides the client the option to reallocate existing assets in step 906. The client is also provided the option of writing a check on available credit in step 907. In step 908, the client is provided the option of selling all or part of the IFMA account assets. Therefore, after displaying an account status in step 909, the client may use the proceeds of the asset sale to pay down/off the loan balance in step 910, and/or purchase other investment assets in step 911, and/or make a partial cash withdrawal in step 912.

In step 913, the client has the option of adjusting the loan terms by modifying interest rate and payment options within specific ranges in step 914, and/or pay down or pay off the loan balance in step 915 or draw down further on the loan in step 916 within permissible ranges established in the account. In step 917, the current account status is displayed and in steps 918 and 919 the clients access session is closed. In step 920, the client can select a rollover option as discussed further herein.

Figure 10:
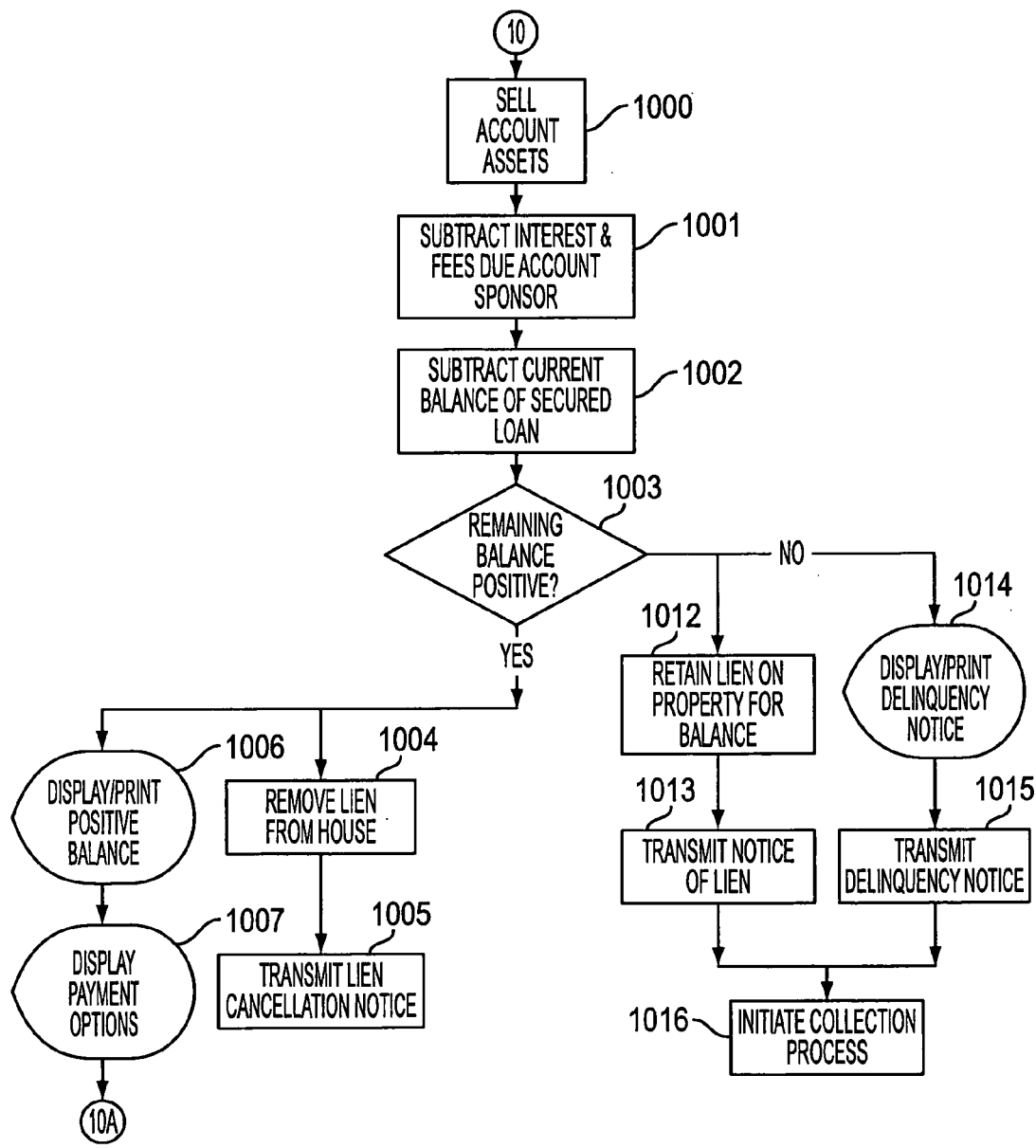
FIGS. 10, 10A, and 11 are flow diagrams illustrating the processing steps for terminating the Integrated Financial Management Account.
Figure 10A:
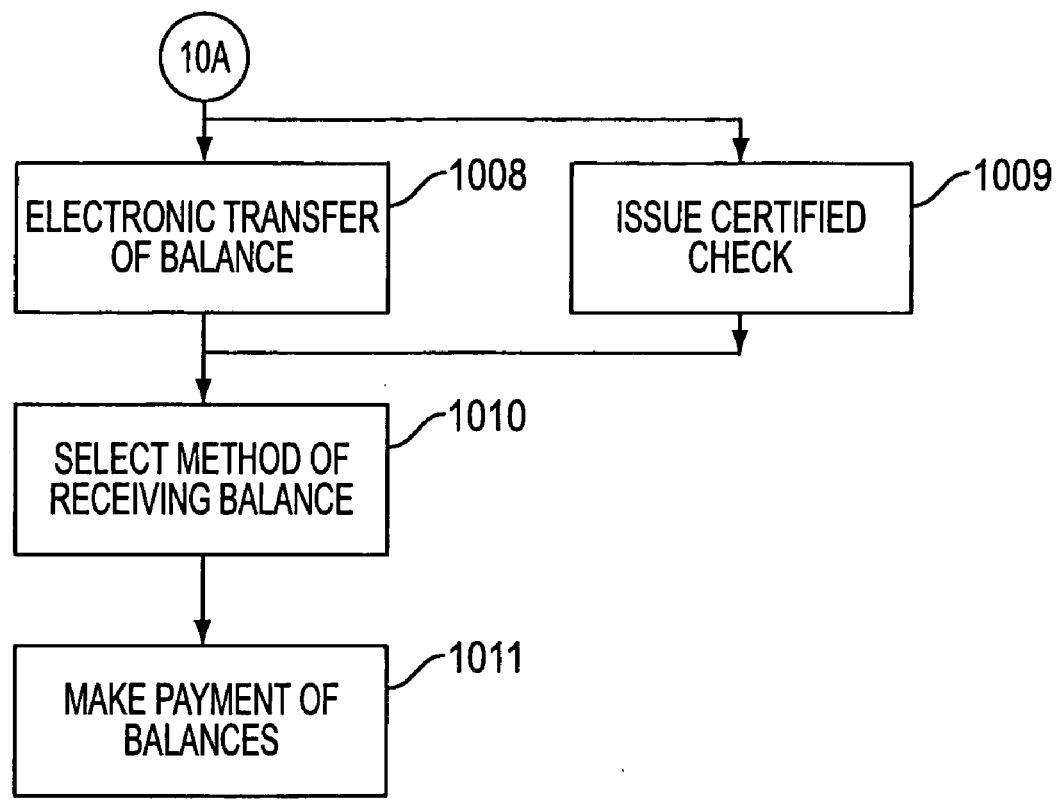

FIGS. 10–10A show exemplary steps carried out when terminating an IFMA account after the IFMA account has been established following approval of a loan in the loan component. In step 1000, the investment assets in the investment component of the IFMA account are sold or otherwise disposed of. In step 1001, the accrued interest and fees due to the IFMA account sponsor is deducted from the proceeds of the sale of the investment assets. Thereafter, in step 1002, the current balance of the secured loan is subtracted to determine if the remaining balance in step 1003 is positive, that is, money is owed to the client.

If the remaining balance in step 1003 is positive, the lien data in the system is deleted for that collateral, such as the house, and a lien cancellation notice is transmitted in step 1005. In step 1006, the remaining positive balance is displayed together with the payment options in step 1007. The payment options include electronic transfer of the remaining balance in step 1008 or the issue of a certified check in step 1009. In step 1010, the client communicates a selection of the preferred payment method and the balance is paid out accordingly in step 1011.

In this context, it should be noted that the present invention provides for a triple protection of the loan principal. First, the there is a lien on the house or other collateral pledged to secure the loan. Second, there is a lien or assignment of the investment assets in the investment component of the IFMA account. Third, there is additional insurance or insurance equivalents (as discussed earlier herein) to cover any residual value of the loan balance after the other pledged assets have been disposed and the proceeds applied to repaying the loan.

Figure 11:
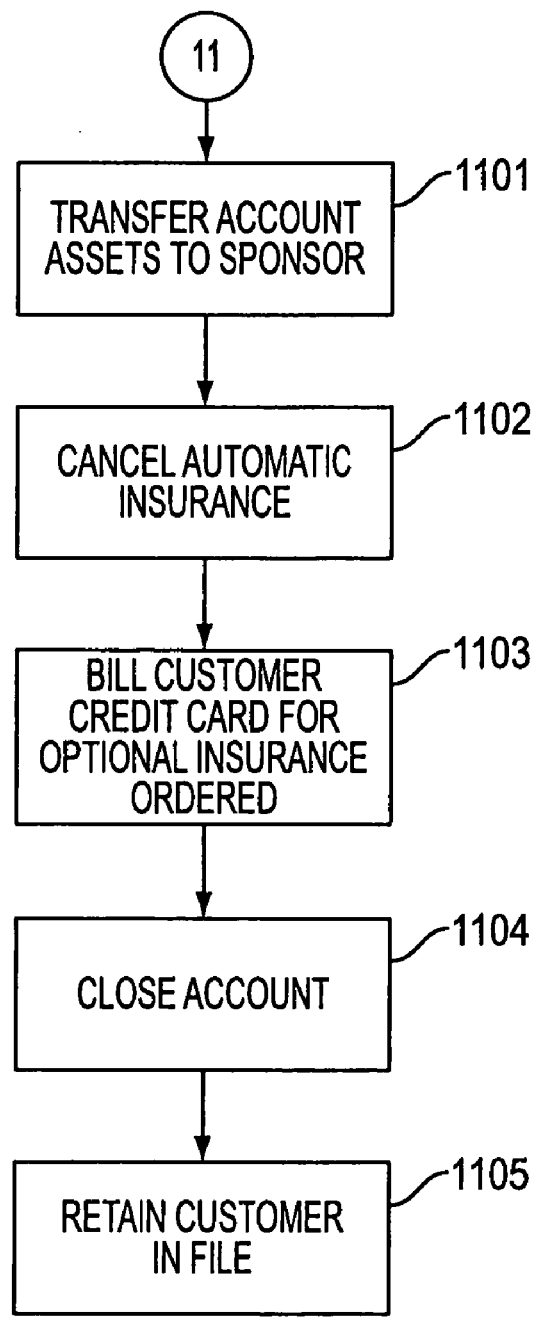

FIG. 11 displays the exemplary processing of an IFMA account termination before a loan is approved in the loan component of the IFMA account, but after an IFMA account shell has been set up and credited with an investment asset in the first preferred embodiment of the present invention. In step 1101, the investment assets are transferred out of the investment component of the IFMA account to the IFMA account sponsor. In step 1102, any automatically provided insurance is cancelled, and in step 1103, the client is billed for any credit cards or optional insurance ordered by the client. Thereafter, the IFMA account is closed in step 1104, while the client information is retained in the files (possibly archived) in step 1105.

Figure 12:
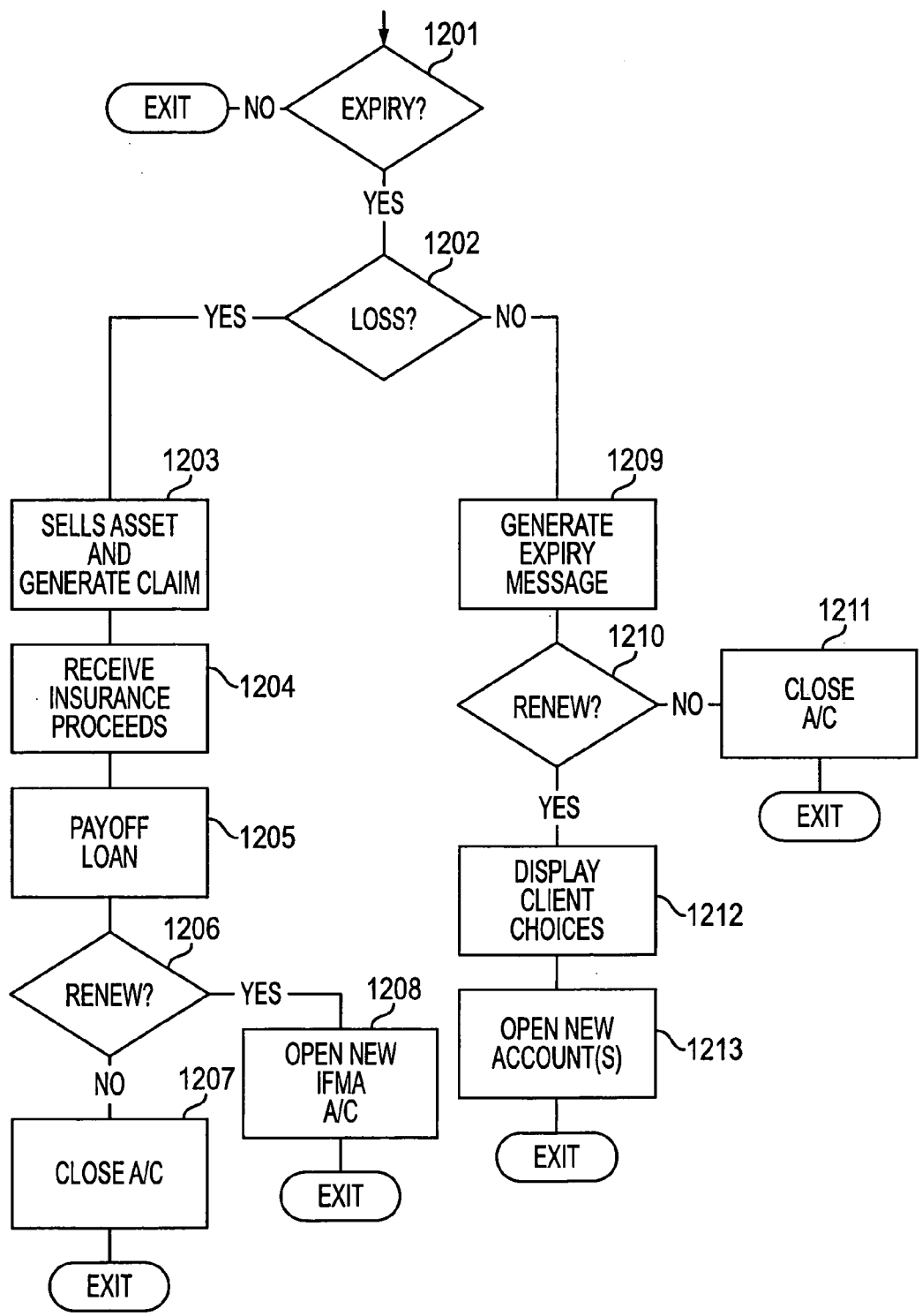
FIG. 12 is a flow diagram illustrating the renewal/termination steps when the Integrated Financial Management Account is provided with automatic insurance coverage for a fixed period.

FIG. 12 discloses the renewal/termination processing steps in one preferred embodiment when the IFMA account provider arranges automatic insurance for the loan principal for a fixed period with an expiry date. In step 1201, the expiry date for the insurance coverage is compared to the current date. If the expiry date has been reached, in step 1202, a profit/loss calculation is performed for the IFMA account by comparing the market value of the investment assets in the investment component to the loan balance in the loan component. If the loan balance is greater than the market value of the investment assets, a loss is determined. Otherwise, in step 1202, no loss is determined.

If a loss is determined in step 1202, the investment assets are sold and an insurance claim is generated in step 1203 for the amount of the loss and a claim to cover the loss is generated and communicated to the insurance provider. Thereafter, in step 1204, the insurance proceeds are received from the insurance provider. In step 1205, the loan is paid off with the proceeds from the sale of the investment assets and the received insurance proceeds. In step 1206, it is checked to see if the client has chosen to renew the IFMA account. If the client has chosen not to renew the IFMA account, the IFMA account is closed in step 1207 and procedures are initiated to collect any dues from the client. Likewise, any balance due to the client is paid out to the client. Once all the dues from the client has been collected, all the mortgages and liens are released. If in step 1206, the client has chosen to renew the account, a new IFMA account with a loan component, an investment component, and an insurance component is set up in step 1208.

If no loss is determined in step 1202, an expiry message is generated and communicated to the insurance provider in step 1209 so that the insurance provider can appropriately adjust the predetermined insurance limit available to the client. Likewise, the IFMA account provider adjusts the predetermined insurance limit available to factor in the expiry of the coverage period of the IFMA account under discussion.

Thereafter, in step 1210, it is determined if client has indicated if the IFMA account is to be renewed. If the account is not to be renewed, the IFMA account is closed in step 1211. Typically, in step 1211, the investment assets are liquidated and any balance owed to the client, after the loan and other charges are paid off, are then paid to the client. Any mortgages or liens are also released.

If the client has chosen to renew the account in step 1211, the client is presented with several renewal choices in step 1212. One option for the client is to open a new IFMA account with a loan corresponding to the full extent of the value of the investment assets. Another option would be for the loan to correspond to a part of the value of the investment asset with the remaining extra investment assets to be disposed of separately. That is, in this option only a part of the investment assets would have a lien to additionally secure the loan in the loan component of the new IFMA account. Some of the options offered to dispose the extra investment assets include (i) liquidate the extra investment assets and pay the proceeds to the client; (ii) use the investment assets to service the loan; (iii) invest the extra investment assets in additional qualified investment assets or products; (iv) maintain the extra investment assets in a separate investment asset account separate from the IFMA account; or (v) do any combination of (i) to (iv). Thereafter, in step 1213, the IFMA account provider renews the IFMA account, in whole or in part, in accordance with the options selected or indicated by the client in step 1212.

In addition to the description of the preferred embodiments described with reference to the figures, the IFMA account provides a client with an opportunity to have an additional margin account on the investment assets in the account, with each account owner offered the opportunity to invest using funds borrowed on margin against other listed securities eligible for borrowing that (a) the account owner physically possess, (b) are in another brokerage account at a third-party, (c) are mutual funds or securities at a fund manager or mutual fund or (d) are in a 401 (k) or Keogh plan. To open this additional margin account the following steps may be completed. The option to open an additional margin account is displayed and the steps explained. The dollar values, types and assets for the margin account displayed and the client completes the list of assets, including account numbers, names of brokerage houses where the assets are held, and the like.

The IFMA system's program computes the market value of the assets available for the margin loans, displays the amount of the asset funds available for purchase, projects a return based on their historical return to the client, calculates the cost of the interest on the loan, and queries the client whether or not they wish to elect the additional margin requirement. If the additional margin account is not chosen, then the program displays the current account of the system without the additional margin account. If the additional margin account is chosen, another linked Margin Account is opened. The conditional assignment of the assets to be used for the Margin Account margin loan is displayed. These can be accepted by electronic signature, with printing and written signature based on a subsequent mailing or use of a credit card for authentication of the customer. The automatically calculated amount of the margin loan is used to purchase the additional amount of the investment assets selected, a listing of which is displayed to the client.

In addition, the client may be offered the optional life insurance for the whole account, which may be accepted or declined and the account recalculated and displayed with the choice elected. Thereafter, the client may be offered optional portfolio insurance for the Margin Account and it will be accepted or declined, and the Margin Account recalculated and displayed with the appropriate choices. Likewise, the client may also be offered the optional retirement planning options, customized performance benchmarks and customized notification methods for the Margin Account. See the earlier discussion of these features above for the preferred embodiment for additional details.

It should be noted that present invention provides that each customer could access the account at any time to confirm the current status of the account. Account balances, investment asset choices, lines of credits, insurance options, and all benchmarks and notification features can be displayed and modified. The client can specify whether or when they wish written account summaries to be printed and mailed, or whether periodic updates should be sent by e-mail, pager, fax, or voice mail. The client can revise these choices at any time and the program and system of present invention will display the revised choices and use them automatically.

It should also be noted that if the client wishes to terminate the account at any time, the customer may simply elect to terminate the IFMA account. All asset and liability values used for termination are derived real time or near real time to the extent possible, i.e., when the markets are open, and the liquidation of assets will occur during the session. All fees, expenses, and liabilities are netted in the IFMA account and settlement of the clients account is made by providing a choice of an electronic transfer, wire transfer into their account, or a check sent by a delivery service for next day delivery. In addition, selected accounts may have the privilege of having pre-issued blank checks and the account owner may then write a check to close the account or make payment for partial asset sales.

Clients may also make modifications in their account to the asset, liability, insurance, benchmark or notification methods at any time, including partial liquidation's and withdrawals, and including modifications in the retirement planning options, automatic margin provisions, the additional margin account or other aspects of the account at any time.

With respect to the retirement planning options, it should be noted that clients may designate certain allocations of investment assets to be transferred directly or in trust to children, relatives, or other parties of their choice, e.g., charities. From the current account status display, the retirement planning Module can be accessed. This provides a number of choices to establish separate accounts for children, spouses, or designated charities or third parties. Options may be provided to establish bank trust(s) that can be independently administered by bank trustees, etc. The Retirement Planning Module will guide the client through the choices and, if chosen, may display, transmit, and print the necessary trust and estate forms, including wills to execute the options elected by the client.

Some of the other features of the present invention are discussed in the following paragraphs.

Internet Broadcasting

The present invention also includes providing a computer implemented method for providing financial services over the Internet including Internet broadcasting or video streaming to deliver information and services requested by clients.

Internet broadcasting is a generic term that covers both live one-way or two-way video and other on demand material, whether video or not, that a user can request. Therefore, the present invention includes using Internet broadcasting to explain, market, sell, and assist people to obtain financial services products from banks, brokerage firms, mutual funds, insurance companies, etc. It is used for offering "an integrated financial management account" as discussed earlier herein and in the appended claims.

Internet broadcasting or video streaming on demand includes calculations to match a customer who has supplied demographic data with a customer service representative or video presenter whose characteristics match the client as closely as possible. Thus the client's question or information request could be answered by a video of a person or a live person chosen to be similar to the customer in some characteristic to the extent feasible to make the customer more comfortable with the customer service representative or presenter in making the financial decision.

SMIL

"SMIL" is a technology whose abbreviation stands for Synchronized Multimedia Integrated Language, which is free software that can be downloaded and allows both Internet broadcasting and data display of a form at the same time on a computer screen. In other words the client can see the person who is helping fill out the form at the same time as filling out the form.

The broadcasting site or Internet server can stream video, still photos, data, charts, and images, and text at the same time for side by side display. This may be used for financial service products, banks, mutual funds, stock brokerage firms, etc. It is intended to be used for all integrated financial management products that have a credit, asset, and insurance component as discussed earlier herein.

Links

The present invention includes providing clients with financial services through an internet website including providing hot links which automatically take the client to another web page of the provider or of a third-party for information or calculations requested by a client.

These technologies include media on demand which works by having a button on the web site, which when clicked, links (or hot links) to another server, which maintains a mirror of the web site web page, and provides a stream or broadcast of the requested content. The reason this technology is preferable relative to importing just the stream or feed into the provider's web site is that when changes are made by the provider of the media on demand, they can be automatically adjusted at the media on demand web site and there is no need to keep adjusting the providers web site every time there is a change in the media on demand server.

Therefore, the present invention includes the use of hot links in financial service products to explain, assist, sell, market or cause Internet broadcasting to be used to sell a financial services product. Whether the link is to a mirrored site on another server or simply imports data, pictures or other information from another site, these are all included in the present invention.

Accordingly, the present invention contemplates the use of hot links to cover banks, brokerage firms, mutual funds, insurance companies, their agents, and certainly anyone who markets an integrated financial management product including an Internet portal (e.g., AOL).

Alternate Application Process

In an alternative application process for the IFMA account, the present invention envisages an Internet company and a bank or mortgage underwriter collaborating to provide the operations and functionality of the IFMA account as discussed in the present application. The client applies to the Internet company (fulfillment company), the Internet company opens an account in the trust department of the bank for the benefit of the applicant/client. The account, which may be an escrow, custodial, or trust account, is opened in the bank for the beneficial ownership of the applicant. However, the bank may not be able to purchase the stock index funds as the investment asset for the IFMA account at that time under current banking law. However the Internet company can. Hence the stock index fund is purchased using the banks trust powers but paid for by the Internet company. That is, the Internet company owns the index fund, the applicant/client has a beneficial interest in the account, which entitles them to the appreciation on the account from the time they open the account, in the first preferred embodiment, and the asset is purchased (provided their loan application is approved). The clients interest becomes absolute when the home equity or other secured loan is completed, documented, the lien registered, and funded. Then the client has the IFMA account with the investment asset fund and the loan liability.

The Internet company purchases the index fund at the time the account is opened by having a corporate line of credit from the bank to the Internet company. In turn, the Internet company pays the bank to buy the index fund on behalf of the applicant/client. For example, in the first preferred embodiment of the present invention, this may be accomplished in FIG. 5I, wherein the investment assets are purchased in step 560 by placing an order for an immediate purchase of the selected assets for a sub-account in the name of the Internet company. The Internet company retains an ownership interest in the stock index fund in case the IFMA account does not get established, that is, funded by the home equity loan. In the event the IFMA account does not get established, the ownership of the stock index fund fully reverts to the Internet company, which sells the stock index fund, pays back the commercial loan from the bank to the fulfillment company, and books a profit or loss on the transaction. Presumably the bank would not show a gain or a loss, unless there was a small transaction processing loss.

The applicant will receive a number of communications (some on line) during the application process and subsequently by a medium of the customers choice such as by mail, voice mail, etc. Some of these communications are:

Notifications sent of the progress in opening the account. For example, "Your index fund XX has been purchase at XXX worth XXX", "Your home appraisal has been completed and is approved", etc.

The present invention contemplates using e-mail, "push technology" (like Point Cast) and "media or video on demand" plus "live video" or video streaming as part of the customer care process.

Push technology will be used to provide information, market data, and customized web page components to clients so that they receive the information they have pre-selected. This is a selection of what they want, a calculation that something they have requested is available, then a communication to their Web page of the pre-selected data when it becomes available.

Media or video on demand will be used to provide an applicant or client with a line video or movie feed on their Web site or page when they request it. These may be MPEG, JPEG or any other similar technology. The client may have a button on the web page to click to ask about a relevant topic and in return receives a video or media explanation of the subject rather than just providing answers to Frequently Asked Questions ("FAQ"). Therefore, movies for FAQ and other topics of interest to the clients may be provided. For example, the question, "How do Stock Index Funds work?" can be answered with a text answer or a video explanation of how they work. "Explain how the rollover feature works?" "How do I know how much house I am [pre] qualified to purchase based on the status of my Account?" These questions could be answered by providing a video explanation of the process followed by a page that can be printed out including actual calculations as of the date it is requested.

This media on demand content can be stored on the Media on Demand web site—mirrored to IFMA account sponsors web site and accessed on demand by individual clients.

Live Video responses similar to video on demand may also include not just FAQ, but also the help desk for computer problems and the help desk of product explanation problems. At a minimum, the present invention contemplates these communication technologies for use in banking, financial services, and integrated financial service products such as the integrated financial managed account of the present invention.

First Mortgage "Guarantee" or Rollover

The present invention also contemplates providing a guarantee of a future or "rollover" first mortgage at the time the initial loan is taken. Therefore, the present invention contemplates a "guaranteed" commitment or a commitment to the person, subject only to limitations based on an appraisal of the subsequent house purchased for the rollover loan.

The present invention also includes at least the following calculations of the client's guaranteed mortgage. One calculation is at the time when the account is opened. Then the second calculation is done on demand when a client wants to know what price house on which they can afford to bid in a particular year. In addition, the provider may periodically, for example, annually remind a client of what their house purchasing power is by running the individual account's balances, projecting the existing house price (subject to sale) and giving the client a "commitment" that they can get a first mortgage of a certain value for the purchase of a house as long as the income, house appraisal, credit are still satisfactory.

The essence of the First Mortgage Guarantee or Rollover feature is a unique calculation that can be performed by the client on demand and periodically by the company to determine the guarantee based on a predetermined formula (for example 75% first mortgage & 25% equity) for optimum pricing (that is, the lowest available rate) that the client's account (including the existing second mortgage that gets rolled over or paid off depending on the transaction) will support the purchase of a house price of a certain price.

This calculation can be performed on demand by the client and can be also performed periodically by the provider or IFMA account sponsor, for example, once every six months or once a year, and communicated electronically by the provider to the client to be sure that the client knows the amount provider is committing to write a first mortgage on given the current balance in their account.

Therefore, the ability to rollover the IFMA account from one house to another is one important feature of the present invention.

Another embodiment of the rollover feature is that the IFMA may be used for a bridge loan supplied by either the IFMA or provided by an associated bank or mortgage underwriter so that the account holder may be able to make an immediate offer on a house that is not contingent on financing provided that the IFMA account holder commits to obtain a sufficiently large first or second mortgage that would pay off the bridge loan. Of course, the bridge loan plus the first and second mortgages should not exceed the underwriting standards for the loan to value on the second house. Further, the assets in the investment components also secure the bridge loan.

The present invention also contemplates that the account, unsecured by a real estate loan for a number of days, is portable as is the underlying mortgage so as be like a lifetime mortgage. Therefore, the portable mortgages can be either a first mortgage or a second mortgage. An amended loan document (promissory note) and a new lien on each subsequent house is needed each time account holder mortgages a new house.

Furthermore, the present invention contemplates that the IFMA can be used with reverse mortgages. That is, payments based on a reverse mortgage can be used to purchase the assets in the investment component of the IFMA.

Automatic Home Owners "Account" Increase

The present invention also contemplates using the fact that as the value of people's houses increase by some percentage in most years, an account holder can become eligible for a larger loan, with the additional proceeds invested in the investment component when the loan is increased. This will have an appeal to many clients, because it will maximize their investment return. Some original home equity loans will be taken out as dollar amounts, others as a percentage of the loan to value so that the first mortgage and the second mortgage do not preferably exceed a 100% loan to value. As the value of the house increases, a calculation is performed that indicates how much more the client can borrow and invest.

The calculation can be calculated automatically by the provider periodically, e.g. once a quarter or once a year. The periodic calculation can be done because (a) the client has elected to have it done and the loan and investment increased automatically, or (b) because the provider on a periodic basis (once a year or every two years) applies an inflation rate factor to the similar houses in the area, county, or state. Also, as option (c), the provider can input the actual inflation rate from a table of public records and initiate the calculation, and then electronically notify the client that he is eligible to increase his account loan and investment by a certain value.

The client can elect to institute the automatic account increase at any time. This is a unique electronic communication from the client to the provider based on a notification from the provider to the client about the opportunity to increase the amount of the loan based on the calculation regarding the value of the house or other security pledged.

College Marketing Option and IRC 501(c)(3) Charitable Deductions

Another feature of the IFMA is that it can be marketed through college development offices. An alumni could be solicited to take an IFMA account and designate the college as the benefactor of the growth of the investment asset over time. To facilitate this, using a pull down menu on a website marketing this product, for example, the alumni could create a revocable or irrevocable trust for the benefit of the college. This would permit the alumni to get a charitable tax deduction on all the interest paid for the loan even where the loan exceeded any limits for an interest tax deduction on a home equity loan (currently $100,000). Furthermore, after a period of time, the alumnus could assign an amount of the appreciation to the college and further get a deduction against ordinary income in the year(s) of the assignment(s). In addition, one option would be a bifurcated option in which the principal of the loan is not part of the trust for the benefit of the college but all of the appreciation in the mutual fund is part of the trust.

Furthermore, the present invention contemplates that such joint marketing may be done with all elemosynary institutions with universities (discussed above) as specific examples.

U.S. Insurance Structure

One feature of the present invention is that the IFMA account provider may structure the insurance so that a national bank, FSB, or other mortgage underwriter may provide the insurance to pay off the loan if the liquidation proceeds of the investment assets are less than the loan balance outstanding in the loan component of the IFMA. The insurance will be mandatory and in effect the bank or mortgage underwriter will have arranged the insurance for itself (i.e., it is self insured by either the bank or the IFMA provider).

The insurance provided according to the present invention can include "asset fund residual value insurance," "mutual fund residual value insurance," "asset fund/mutual fund maintenance of value insurance," and "loan principal payoff insurance."

The present invention also contemplates at least the following specific insurance coverages. First, the entire principal of the home equity loan is insured so that the borrower cannot loose their house. Second, the gains on the portfolio (the investment assets) may be insured.

By the term "insurance," the present invention contemplates financial instruments and other insurance equivalents. These may include financial guarantees, a standby letter of credit, a total interest rate return swap, puts and calls, or any other type of financial contract that serves the purpose of asset preservation or protection.

In addition, to the asset preservation insurance, the IFMA account provider can easily broker (and eventually underwrite) AD&D and credit life policies.

Furthermore, the present invention contemplates insurance coverage both with or without a specified period of time the product must be held. Furthermore, the concept of maturity of a financial contract can be used to determine a specified duration for which an insurance coverage may be carried.

Account Opening, Loan Terms and Liens

As discussed earlier, in one preferred embodiment, the present invention contemplates the more conventional approach of underwriting the loan, funding it and then purchasing the assets in the investment component of the IFMA.

In one preferred embodiment, the present invention contemplates that the client may move back and forth between a fixed and variable rates as well as increase the amount of the loan automatically.

Furthermore, the IFMA account provides a triple collateral for the loan in the loan component of the IFMA. There is a lien on the house of the client. There is a lien or assignment of the investment assets (e.g. mutual fund). There is insurance for any shortfall. Therefore, there is a triple protection of the loan principal (in whole or in part).

It should noted that the claims recite that the data processed according to the present invention are stored in one or more files, such as an account file that stores the information relating to an integrated financial management account according to the present invention. It is to be understood that these "logical" file or files can be physically implemented by one or more physical files or using one or more commercial database management system files managed by appropriate database management software. Furthermore, as would be recognized by those skilled in the art, these file(s) could be physically located at one computer system and/or data storage device or could be distributed over many computer systems and/or data storage devices connected by one or more networks with appropriate database and application software coordinating the reading, writing and updating of the data on these distributed or centralized "files." The term "file" encompasses the linking or association of local or remote electronic data with a file. The term "associating with" is intended to be interpreted broadly to encompass both data that is stored physically within a file, and also data that is disposed at a remote location and is appropriately electronically linked to the file.

Additionally, it should be noted that a variety of communications have been described in the present invention, which may be accomplished in any convenient manner, including through the use of wireless technology.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A computer implemented method of providing a client with an integrated financial management account, the integrated financial management account including an investment component linked to a loan component, the method comprising the steps of:

receiving application data for the integrated financial management account online directly from the client;

setting up the integrated financial management account with investment component data and loan component data associated with an account file at the time of setting up of the integrated financial management account;

linking the loan component data to the investment component data in the step of setting up the integrated financial management account;

contemporaneous with the step of setting up the integrated financial management account in the account file, associating an investment asset to the investment component data in the account file based on the linking of the loan component data to the investment component data, wherein the client is credited with the investment asset in the investment component of the integrated financial management account;

qualifying the client for a loan in the loan component of the integrated financial management account and recording the qualification in the account file; and after successful loan qualification, disbursing the proceeds of the loan component into the investment component by storing a value of the proceeds in the investment component data in the account file, or after unsuccessful qualification, removing the association of the investment asset to the investment component data in the account file.

2. The computer implemented method according to claim 1, wherein the investment asset associated with the investment component data is selected from a predetermined list of investments.

3. The computer implemented method according to claim 1, wherein the step of setting up the integrated financial management account includes pre-qualifying the client and, wherein the step of pre-qualifying the client includes the step of determining a preliminary credit score for the client and determining that the preliminary credit score meets a predetermined threshold score.

4. The computer implemented method according to claim 1, wherein the title in the investment asset remains with a provider of the integrated financial management account until the step of disbursing the proceeds of the loan component is recorded in the investment component data in the account file.

5. The computer implemented method according to claim 1, wherein the type of the loan in the loan component is stored as loan component data in the account file, and wherein the type of the loan includes a mortgage loan.

6. The computer implemented method according to claim 5, wherein the type of the loan in the loan component is one of a first mortgage, a second equity mortgage loan, a third equity mortgage loan, other sub-ordinate mortgage loan, and a reverse mortgage.

7. The computer implemented method according to claim 1, wherein a type of the investment asset is stored in the investment component data in the account file and includes one of an equity-index fund, a bond-index fund, and a combination of an equity index fund and a bond index fund and a mutual fund.

8. The computer implemented method according to claim 1, wherein the step of receiving application data includes calculating and displaying projections for a growth of investment assets over time.

9. The computer implemented method according to claim 1, wherein the step of qualifying the client includes calculation of a credit score for credit approval.

10. The computer implemented method according to claim 5, further including the step of customizing the mortgage loan data based on computer generated projections of fixed and variable terms, amortization options, and different interest rate and origination fee combinations and displaying the customized mortgage data.

11. The computer implemented method according to claim 1, further including the step of:

notifying the client whenever either the loan component or the investment component achieves a client configurable benchmark value.

12. The computer implemented method according to claim 1, further comprising the step of:

marking to market the investment asset and the loan, in real time or near real time, and updating the investment component data and the loan component data and communicating the updated data to the client.

13. The computer implemented method according to claim 1, further including the steps of:
   marking to market, in real time or near real time, and updating the investment component data and the loan component data and communicating the updated data to the client; and
   notifying the client automatically whenever the value of either the investment component asset or the loan in the loan component reaches or exceeds a configurable benchmark.

14. The computer implemented method according to claim 6, further including the steps of:
   receiving data for a rollover of the integrated financial management account to a mortgage based on a second property different from a first property used in the step of qualifying the client for the original loan in the loan component, wherein said integrated financial management account is associated with a lien file which stores lien data of property associated with the integrated financial management account;
   storing the mortgage loan data, secured to the second property, in the loan component data in the account file; and
   subtracting the value of the client's equity in the first property and the investment asset in the investment component from the balance of the original loan in the loan component and storing the repayment information in the loan component data of the account file.

15. The computer implemented method according to claim 14, wherein the step of receiving data for a rollover includes calculating and displaying financial projections based on projection of the increase in home equity on projected property appreciation and current value of investment assets.

16. The computer implemented method according to claim 1, wherein the step of receiving application data is performed through the Internet or other electronic network.

17. The computer implemented method according to claim 1, wherein the step of receiving application data includes the step of an online filling of an application form at an online terminal.

18. The computer implemented method according to claim 17, wherein the online terminal includes one of a laptop computer, a notebook computer, a hand held computer, a pager, a web-enabled television, telephone, and other wireless device.

19. The computer implemented method according to claim 16, wherein the step of receiving the application data includes the step of an online filling of an application form by one of the client and a third party at an online terminal.

20. The computer implemented method according to claim 19, wherein the online terminal is located at one of a bank branch, a bank ATM, a booking office, an affinity group office, a telephone call center, a retail store, a brokerage house, the client's home, and the client's office.

21. The computer implemented method according to claim 1, wherein contemporaneous with setting up the integrated financial management account in the account file performing the steps of:
   displaying detailed insurance options for selection by the client, and
   associating a portfolio insurance selected by the client with an insurance component data of the integrated financial management account.

22. The computer implemented method according to claim 21, wherein the insurance option displayed includes a life and disability insurance for a duration between providing the client with the investment asset and a specific time determined by the client or a provider of the integrated financial management account.

23. The computer implemented method according to claim 1, further including the steps of:
   storing information regarding pledges of additional qualified assets in the loan component data associated with the account file;
   calculating and providing an additional loan against the pledged assets and storing the additional loan information in the loan component data associated with the account file; and
   investing the proceeds of the loan to purchase additional investment assets and storing information regarding the additional investment assets in the investment component data associated with the account file.

24. The computer implemented method according to claim 1, wherein the step of qualifying the client for a loan includes the step of retrieving, through an electronic network, both the client's credit history, and title history and appraisal on a property that is associated with the loan component data in the account file.

25. The computer implemented method according to claim 1, further including displaying account management options for a client to administer the integrated financial management account online on a real or near real time basis seven days a week and twenty four hours a day.

26. The computer implemented method according to claim 1, further including displaying account management options for a client to administer the integrated financial management account online by modifying stored parameters related to the loan component data and the investment component data.

27. The computer implemented method according to claim 1, wherein the step of receiving application data includes receiving and verifying an electronic signature.

28. The computer implemented method according to claim 1, further including the steps of
   displaying a plurality of retirement planning options for selection by a client; and
   calculating and displaying an account value in response to the selected retirement planning option.

29. The computer implemented method according to claim 1, further including the step of providing an interface for making payments to the integrated financial management account using one of a credit card, a debit card, a smart card, and debiting a checking account.

30. The computer implemented method according to claim 29, further including the step adding to the investment component data the additional purchased investment asset.

31. The computer implemented method according to claim 29, wherein a credit card, a debit card, and a smart card are used to pay account fees.

32. The computer implemented method according to claim 1, further comprising the steps of:
   determining an increase in value of the investment asset based on the investment component data associated with the account file;
   calculating an additional margin loan for the increase in value of the investment asset; and
   updating the investment component data with additional investment assets purchased using the additional margin loan.

33. The computer implemented method according to claim 19, wherein the online terminal includes one of a computer terminal and a web enabled television.

34. The computer implemented method according to claim 19, wherein the online terminal includes an Internet enabled device for accessing the Internet.

35. The computer implemented method according to claim 1, further comprising the step of:
displaying help and options using multi-media displays to sell, explain or solicit the integrated financial management account.

36. The computer implemented method according to claim 1, further comprising the step of:
displaying hot links or metatags to web pages that sell, explain or solicit the integrated financial management account.

37. The computer implemented method according to claim 35, wherein the multi-media display includes audio and video streams.

38. The computer implemented method according to claim 11, further comprising the step of displaying an online interface to interactively configure the benchmarks.

39. The computer implemented method according to claim 1, wherein the step of qualifying the client for a loan in the loan component further includes calculating a loan commitment for a predetermined sum for a future purchase of a property by the client and storing the loan commitment data in the loan component data.

40. The computer implemented method according to claim 5, further comprising the steps of:
periodically assessing the value of a property pledged for the mortgage loan;
calculating an increase in the value of the property;
calculating and providing an additional loan as a percentage of the increase in the value of the property and storing the additional loan in the loan component data; and
storing additional investment asset information in the investment component data on the additional investment assets purchased based on the additional loan.

41. The computer implemented method according to claim 1, further including the step of:
calculating and storing a reduction in the loan balance in the loan component data based on transferring proceeds of a sale of investment assets whose information is stored in the investment component data.

42. The computer implemented method according to claim 1, further comprising the step of:
displaying an option for increasing, by the client, the outstanding balance in the loan component to generate additional funds; and
transferring the additional funds to the investment component to update the investment component data associated with the account file.

43. The computer implemented method according to claim 1, further including the step of:
displaying an option for paying fees on the investment component of the integrated financial management account by allowing a client to increase an interest rate on the loan in the loan component and storing the increased interest rate in the loan component data associated with the account file.

44. The computer implemented method of claim 1, further including the step of:
displaying an option for increasing an interest rate on the loan by a client to pay account dues and storing the increased interest rate in the loan component data associated with the account file.

45. The computer implemented method of claim 44, wherein the account dues includes insurance fees or asset management fees.

46. The computer implemented method according to claim 1, further including the step of:
storing a provider-assigned percentage of the investment assets in the investment component data associated with the account file in order to indicate that a percentage of the investment assets in the investment component has been assigned to the provider of the integrated financial management account to pay fees on the investment component.

47. The computer implemented method according to claim 1, further including the step of:
storing a provider-assigned percentage of the investment assets in the investment component data associated with the account file in order to indicate that a percentage of the investment assets in the investment component has been assigned to the provider of the integrated financial management account to pay any account dues.

48. The computer implemented method according to claim 1, wherein the step of receiving application data is performed by a bank, and
wherein the investment asset, in the step of crediting the investment component of the integrated financial management account, is purchased by an Internet company having an agreement with the bank.

49. The computer implemented method according to claim 1, further including the step of:
displaying for public auction over the Internet one of the integrated financial management account, the investment component, and the loan component.

50. The computer implemented method according to claim 1, further comprising the step of:
calculating a guaranteed rollover loan amount for the purchase of a second property based on the appraised value of a first property, whose lien data is associated with the loan component in the loan component data, and on values of the investment component and the loan component associated with the integrated financial management account.

51. The computer implemented method according to claim 50, further comprising the step of:
communicating to the client, periodically or on demand, the calculated guaranteed rollover loan amount.

52. The computer implemented method according to claim 1, further comprising the step of:
calculating an increase in the value of a property whose lien data is associated with the loan component in the loan component data; and
determining an additional loan amount eligibility in the loan component based on the calculated increase in the value of the property.

53. The computer implemented method according to claim 52,
associating additional investment assets with the investment component data based on additional investment assets purchased with the proceeds of the additional loan amount eligibility determined based on the calculated increase in the value of the property.

54. A computer data storage medium having program code recorded thereon for providing a client with an integrated financial management account, the program code comprising:
a first program code for receiving application data for the integrated financial management account online directly from the client;

a second program code for setting up an integrated financial management account with an investment component data and a loan component data stored associated with an account file at the time of setting up of the integrated financial management account, and linking the loan component data to the investment component data when setting up the integrated financial management account, a third program code, that contemporaneous with the setting up of the integrated financial management account credits an investment asset to the investment component data in the account file based on the linking of the loan component data to the investment component data wherein the client is credited with an investment asset in the investment component of the integrated financial management account;

a fourth program code that qualifies the client for a loan in the loan component of the integrated financial management account and associates the qualification with the account file; and a fifth program code, that after successful loan qualification, disburses proceeds of the loan into the investment component by storing the proceeds in the investment component data associated with the account file, or after unsuccessful loan qualification removes the association of investment asset to the investment component data associated with the account file.

55. The computer data storage medium according to claim 54, further comprising a sixth program code, that contemporaneous with the setting up of the integrated financial management account, associates a portfolio insurance selection by the client with an insurance component data of the integrated financial management account.

56. A system for providing a client with an integrated financial management account, the system comprising:

means for receiving application data for the integrated financial management account online directly from the client;

means for setting up the integrated financial management account with investment component data and loan component data associated with an account file at the time of setting up the integrated financial management account, and linking the loan component data to the investment component data when setting up the integrated financial management account;

means for associating an investment asset to the investment component data based on the linking of the loan component data to the investment component data, contemporaneous with the setting up the integrated financial management account, wherein the client is credited with the investment asset which is recorded in the investment component data of the integrated financial management account;

means for qualifying the client for a loan in loan component of the integrated financial management account and recording the qualification in the account file;

means for disbursing the proceeds of the loan component into the investment component, after successful loan qualification, by storing a value of the proceeds in the investment component data; and means for removing the association of the investment asset to the investment component data, after unsuccessful loan qualification.

57. The system according to claim 56, further comprising means for associating a portfolio insurance selection by the client with an insurance component data of the integrated financial management account contemporaneous with setting up the integrated financial management account.

* * * * *